United States Patent
Tash et al.

(10) Patent No.: US 11,493,398 B2
(45) Date of Patent: Nov. 8, 2022

(54) DRAINPIPE TEST PLUG WITH PRESSURE ASSISTED PLUG SEAL

(71) Applicants: George Tash, Moorpark, CA (US); Trinidad Martinez, Moorpark, CA (US)

(72) Inventors: George Tash, Moorpark, CA (US); Trinidad Martinez, Moorpark, CA (US)

(73) Assignee: GEORGE TASH & DEBRA B. TASH, Somis, CA (US), as Trustees of the Community Trust ( * ) Notice: Subject to any disclaimer, the term of this patent is extended or adjusted under 35 U.S.C. 154(b) by 286 days.

(21) Appl. No.: 16/845,480

(22) Filed: Apr. 10, 2020

(65) Prior Publication Data
US 2021/0318198 A1    Oct. 14, 2021

(51) Int. Cl.
| | |
|---|---|
| *F16L 55/10* | (2006.01) |
| *G01M 3/02* | (2006.01) |
| *F16L 55/11* | (2006.01) |
| *G01M 3/28* | (2006.01) |

(52) U.S. Cl.
CPC ......... *G01M 3/022* (2013.01); *F16L 55/1141* (2013.01); *G01M 3/2807* (2013.01)

(58) Field of Classification Search
CPC ... G01M 3/022; G01M 3/2807; F16L 55/1141
USPC .............................................. 138/90, 92, 94
See application file for complete search history.

(56) References Cited

U.S. PATENT DOCUMENTS

| | | | | | |
|---|---|---|---|---|---|
| 1,288,092 | A | * | 12/1918 | McWane | B29C 66/1122 285/285.1 |
| 1,758,541 | A | * | 5/1930 | Simon | E03C 1/306 4/255.09 |
| RE24,534 | E | * | 9/1958 | Dahl | G05D 7/012 239/533.14 |
| 3,154,106 | A | * | 10/1964 | Ver Nooy | F16L 55/105 138/94 |

(Continued)

OTHER PUBLICATIONS

GTWATER Products, Inc., TTMP Series Test Tee Mechanical Test Plug, Great for Multi-Level Testing! Installs in Seconds, Mar. 24, 2016, pp. 1-2.

(Continued)

*Primary Examiner* — James F Hook
(74) *Attorney, Agent, or Firm* — Lyon & Harr, LLP; Richard T. Lyon

(57) ABSTRACT

A drainpipe test plug for plugging a drainpipe via an opening formed therein includes a plug seal that includes a planar front surface which faces upward in the drainpipe whenever the drainpipe test plug is in a plugging position and a peripheral annular rim. The plug seal can include a plurality of holes or a continuous channel formed into the surface of the planar front surface, or a plurality of holes or a continuous channel formed into the surface of the peripheral annular rim, or both. The plug seal holes or channels impart a degree of flexibility to a peripheral area of the plug seal to facilitate the insertion and removal of the drainpipe test plug from the drainpipe. In addition, the holes or channel in the planar front surface provide additional sealing force against the interior of the drainpipe whenever the drainpipe test plug is in the plugging position.

30 Claims, 11 Drawing Sheets

(56) References Cited

U.S. PATENT DOCUMENTS

| | | | | |
|---|---|---|---|---|
| 3,626,475 | A | * | 12/1971 | Hicks .................. F16K 51/00 138/94 |
| 4,429,568 | A | | 2/1984 | Sullivan |
| 4,430,887 | A | | 2/1984 | Robert |
| 4,442,703 | A | | 4/1984 | Herman |
| 4,460,019 | A | | 7/1984 | Condon |
| 6,062,262 | A | | 5/2000 | Tash |
| 6,289,935 | B1 | | 9/2001 | Tash |
| 7,021,337 | B2 | | 4/2006 | Markham |
| 7,849,882 | B1 | * | 12/2010 | Lee ..................... F16L 55/124 138/91 |
| 9,243,829 | B1 | | 1/2016 | Parnell |
| 9,719,624 | B2 | * | 8/2017 | Jackson ............. F16L 55/105 |
| 10,683,958 | B1 | * | 6/2020 | Tash ................... F16L 55/1018 |
| 2006/0254660 | A1 | * | 11/2006 | McIlwain ........... F16L 55/1141 138/89 |
| 2008/0184783 | A1 | | 8/2008 | Chromey |
| 2010/0243090 | A1 | | 9/2010 | Peterson |
| 2012/0189469 | A1 | | 7/2012 | Chou |
| 2018/0252612 | A1 | | 9/2018 | Tash |
| 2020/0232872 | A1 | * | 7/2020 | Tash ..................... F16L 55/105 |

OTHER PUBLICATIONS

GTWATER Products, Inc., TTMP Series Test Tee Mechanical Test Plug, Holds Up to 15 Stories Pressure Installs in Seconds!, Mar. 2014, pp. 1-2.

Oatey Company, Clean-Seal 2 Plug it . . . Fill it . . . Drain it!, http://www.oatey.com/doc/cleanseal2sellsheet1-16art.PDF, Jan. 2016, 1 page.

YouTube video, TTMP Test Tee Mechanical Plug, Sizes 6"-10" with (Water-Fill Feature), GT Water Products Inc., Feb. 26, 2016, total time: 4:07.

* cited by examiner

DRAINPIPE TEST PLUG WITH PRESSURE ASSISTED PLUG SEAL

BACKGROUND

Devices for plugging pipes to prevent the flow of water are commonly used when testing pipe systems for leaks in homes, apartments or other buildings. When testing for leaks, the main drainpipe in a building is typically sealed or plugged via a side opening or clean-out pipe attached to the main drainpipe that serves the building. The building's drainpipe system is then typically pressurized by filling the system above the plug with water. The pressurized system is then inspected for leaks. Following completion of leak inspections, the device used to seal or plug the drain is removed to drain the water from the pipe system.

SUMMARY

Drainpipe test plug implementations described herein generally involve a device for temporarily plugging (e.g., sealing) a drainpipe via an opening that is formed therein. In an exemplary implementation, the drainpipe test plug includes a lever arm that includes a front portion and a rear portion. The drainpipe test plug also includes a positioning arm assembly that is rotatably coupled to the rear portion of the lever arm and is adapted to releasably engage with the rear portion of the lever arm and a bottom rim of the opening in order to lock the device into the plugging position. The drainpipe test plug further includes a plug seal assembly that is securely coupled to the front portion of the lever arm and which mechanically seals the drainpipe whenever the drainpipe test plug is in the plugging position within the drainpipe. The plug seal assembly includes a plug seal having a planar front surface which faces upward in the drainpipe whenever the drainpipe test plug is in the plugging position, a planar rear surface that is substantially parallel to the planar front surface and a peripheral annular rim. The plug seal also includes a plurality of holes formed into the surface of the peripheral annular rim which impart a degree of flexibility to a peripheral area of the plug seal to facilitate the insertion and removal of the drainpipe test plug from the drainpipe. The plug seal holes provide the degree of flexibility without jeopardizing the durability of the peripheral area of the plug seal or degrading the stiffness of the plug seal to the point that test fluid leaks past the plug seal whenever the drainpipe test plug is locked into the plugging position.

In another exemplary implementation, the drainpipe test plug includes a lever arm that includes a front portion and a rear portion, and a positioning arm assembly that is rotatably coupled to the rear portion of the lever arm and is adapted to releasably engage with the rear portion of the lever arm and a bottom rim of the opening in order to lock the device into the plugging position. The drainpipe test plug also includes a plug seal assembly that is securely coupled to the front portion of the lever arm and which mechanically seals the drainpipe whenever the drainpipe test plug is in the plugging position within the drainpipe. The plug seal assembly includes a plug seal having a planar front surface which faces upward in the drainpipe whenever the drainpipe test plug is in the plugging position, a planar rear surface that is substantially parallel to the planar front surface and a peripheral annular rim. The plug seal has a leading quadrant, a right side quadrant, a left side quadrant and a trailing quadrant, where the leading quadrant of the test plug contacts the interior surface of the drainpipe on a same side as the opening formed in the drainpipe whenever the drainpipe test plug is in the plugging position. The plug seal also includes a plurality of holes formed into the surface of the planar front surface at least in the leading quadrant of the test plug. The plug seal holes impart a degree of flexibility to a peripheral area of the plug seal to facilitate the insertion and removal of the drainpipe test plug from the drainpipe while providing additional sealing force against the interior of the drainpipe whenever the drainpipe test plug is in the plugging position to prevent test fluid in the drainpipe above the drainpipe test plug from leaking past the plug seal. The plug seal holes provide the degree of flexibility and additional sealing force without jeopardizing the durability of the peripheral area of the plug seal.

In yet another exemplary implementation, the drainpipe test plug includes a lever arm that includes a front portion and a rear portion, and a positioning arm assembly that is rotatably coupled to the rear portion of the lever arm and is adapted to releasably engage with the rear portion of the lever arm and a bottom rim of the opening in order to lock the device into the plugging position. The drainpipe test plug also includes a plug seal assembly that is securely coupled to the front portion of the lever arm and which mechanically seals the drainpipe whenever the drainpipe test plug is in the plugging position within the drainpipe. The plug seal assembly includes a plug seal having a planar front surface which faces upward in the drainpipe whenever the drainpipe test plug is in the plugging position, a planar rear surface that is substantially parallel to the planar front surface and a peripheral annular rim. The plug seal has a leading quadrant, a right side quadrant, a left side quadrant and a trailing quadrant, where the leading quadrant of the test plug contacts the interior surface of the drainpipe on a same side as the opening formed in the drainpipe whenever the drainpipe test plug is in the plugging position. The plug seal also includes a continuous channel formed into the surface of the planar front surface at least in the leading quadrant of the test plug. The plug seal channel imparts a degree of flexibility to a peripheral area of the plug seal to facilitate the insertion and removal of the drainpipe test plug from the drainpipe while providing additional sealing force against the interior of the drainpipe whenever the drainpipe test plug is in the plugging position to prevent test fluid in the drainpipe above the drainpipe test plug from leaking past the plug seal. The plug seal channel provides the degree of flexibility and additional sealing force without jeopardizing the durability of the peripheral area of the plug seal.

In yet another exemplary implementation the drainpipe test plug includes a lever arm that includes a front portion and a rear portion. The drainpipe test plug also includes a positioning arm assembly that is rotatably coupled to the rear portion of the lever arm and is adapted to releasably engage with the rear portion of the lever arm and a bottom rim of the opening in order to lock the device into the plugging position. The drainpipe test plug further includes a plug seal assembly that is securely coupled to the front portion of the lever arm and which mechanically seals the drainpipe whenever the drainpipe test plug is in the plugging position within the drainpipe. The plug seal assembly includes a plug seal having a planar front surface which faces upward in the drainpipe whenever the drainpipe test plug is in the plugging position, a planar rear surface that is substantially parallel to the planar front surface and a peripheral annular rim. The plug seal also includes a continuous channel formed into the surface of the peripheral annular rim which imparts a degree of flexibility to a peripheral area of the plug seal to facilitate the insertion and removal of the drainpipe test plug from the drainpipe. The plug seal channel provides the degree of flexibility without jeopardizing the durability of the peripheral area of the plug seal or degrading the stiffness of the plug seal to the point that test fluid leaks past the plug seal whenever the drainpipe test plug is locked into the plugging position.

It should be noted that the foregoing Summary is provided to introduce a selection of concepts, in a simplified form, that are further described below in the Detailed Description. This Summary is not intended to identify key features or essential features of the claimed subject matter, nor is it intended to be used as an aid in determining the scope of the claimed subject matter. Its sole purpose is to present some concepts of the claimed subject matter in a simplified form as a prelude to the more-detailed description that is presented below.

DESCRIPTION OF THE DRAWINGS

The specific features, aspects, and advantages of the drainpipe test plug implementations described herein will become better understood with regard to the following description, appended claims, and accompanying drawings where:

DETAILED DESCRIPTION

Figure 1:
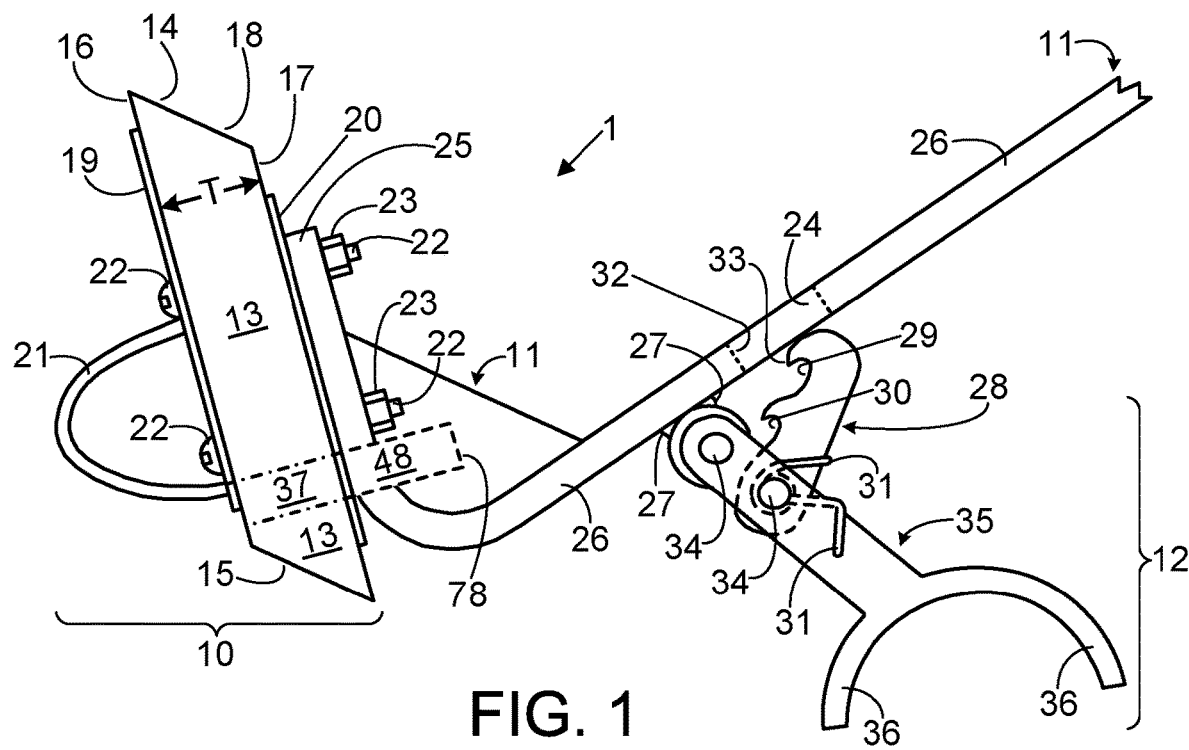
FIG. 1 is a diagram illustrating a partially-transparent side plan view, in simplified form, of an exemplary implementation of a drainpipe test plug.

In the following description of drainpipe test plug implementations reference is made to the accompanying drawings which form a part hereof, and in which are shown, by way of illustration, specific implementations in which the drainpipe test plug can be realized. It is understood that other implementations can be utilized and structural changes can be made without departing from the scope of the drainpipe test plug implementations.

It is also noted that for the sake of clarity specific terminology will be resorted to in describing the drainpipe test plug implementations described herein and it is not intended for these implementations to be limited to the specific terms so chosen. Furthermore, it is to be understood that each specific term includes all its technical equivalents that operate in a broadly similar manner to achieve a similar purpose. Reference herein to "one implementation", or "another implementation", or an "exemplary implementation", or an "alternate implementation", or a "tested implementation", or "one version", or "another version", or an "exemplary version", or an "alternate version", or a "tested version", or "one variant", or "another variant", or an "exemplary variant", or an "alternate variant", or a "tested variant" means that a particular feature, a particular structure, or particular characteristics described in connection with the implementation/version/variant can be included in at least one implementation of the drainpipe test plug. The appearances of the phrases "in one implementation", "in another implementation", "in an exemplary implementation", "in an alternate implementation", "in a tested implementation", "in one version", "in another version", "in an exemplary version", "in an alternate version", "in a tested version", "in one variant", "in another variant", "in an exemplary variant", "in an alternate variant", and "in a tested variant" in various places in the specification are not necessarily all referring to the same implementation/version/variant, nor are separate or alternative implementations/versions/variants mutually exclusive of other implementations/versions/variants. Yet furthermore, the order of method flow representing one or more implementations, or versions, or variants of the drainpipe test plug does not inherently indicate any particular order nor imply any limitations of the drainpipe test plug.

Furthermore, to the extent that the terms "includes," "including, "has," "contains," variants thereof, and other similar words are used in either this detailed description or the claims, these terms are intended to be inclusive, in a manner similar to the term "comprising", as an open transition word without precluding any additional or other elements.

1.0 Drainpipe Test Plug

The drainpipe test plug implementations described herein generally involve a device for temporarily plugging (e.g., sealing) a drainpipe via an opening that is formed therein. The term "drainpipe" is used herein to refer to a series of pipes that is interconnected via various types of fittings to form a drainpipe system in a building or any other type of facility, where the egress of the drainpipe system is connected to a sewer system. As will be appreciated from the more detailed description that follows, the just-described opening can take various forms. By way of example but not limitation, in the drainpipe test plug implementations that are described in more detail hereafter, the opening is formed by a conventional drain clean-out port that is fitted into the drainpipe to be plugged or the drainpipe system to be tested. It is noted that the opening can also be any other type of side opening that is formed in the drainpipe to be plugged or the drainpipe system to be tested.

The drainpipe test plug implementations described herein are advantageous for various reasons including, but not limited to, the following. As will be appreciated from the foregoing and the more-detailed description that follows, the drainpipe test plug implementations can be used to temporarily prevent (e.g., block) the flow of any fluid in a drainpipe. The drainpipe test plug implementations can also be used to pressurize a drainpipe with a prescribed fluid (such as water or any other desired type of fluid) or a prescribed gas (such as air or any other desired type of gas). It will be appreciated that the pressure in a drainpipe that is filled with fluid increases in direct proportion to the height of the fluid in the drainpipe. Consequently, any device that is used to plug a drainpipe in a building, where the drainpipe is filled with fluid, generally has to withstand an increasing amount of back pressure as the height of the building increases. The drainpipe test plug implementations can also be used to temporarily plug drainpipes in buildings of any height and will maintain a mechanical seal created by this plugging when exposed to back pressure from fluid levels of any height, and for any desired length of time, without bleeding or leakage past the drainpipe test plug. In other words, the drainpipe test plug implementations can maintain a mechanical seal in a drainpipe for long periods of time when exposed to a wide range of pressures in the drainpipe.

The drainpipe test plug implementations described herein can also be easily inserted through the aforementioned opening and into a drainpipe, and easily and reliably positioned (e.g., maneuvered) within the drainpipe in order to plug it for testing, without damaging the drainpipe or the opening. Once this testing is completed the drainpipe test plug implementations can be easily withdrawn from the drainpipe and the opening in order to unplug the drainpipe, again without damaging the drainpipe or the opening. In the case where the opening is formed by the aforementioned drain clean-out port and a short length of clean-out pipe extends from this port, the drainpipe test plug implementations can be easily inserted through this clean-out pipe and into the drainpipe, and then easily withdrawn from the drainpipe and the clean-out pipe, regardless of the angle at which the clean-out pipe is oriented with respect to the drainpipe (e.g., a 45 degree angle, or a 90 degree angle, or any other angle).

The drainpipe test plug implementations described herein are also simple, easy to use, durable, inexpensive, compact, light in weight and can be safely operated by a single user. The term "user" or "tester" is used herein to refer to a person who utilizes the drainpipe test plug implementations to temporarily plug a drainpipe that is part of a drainpipe system, and then test the drainpipe system for leaks. Accordingly, a user can be thought of as an operator of the drainpipe test plug implementations. The drainpipe test plug implementations can also be adapted for use in a wide range of drainpipe sizes (e.g., internal diameters). The drainpipe test plug implementations can also be easily and inexpensively fabricated using a variety of inexpensive but durable materials, some examples of which are described in more detail hereafter.

Figure 2:
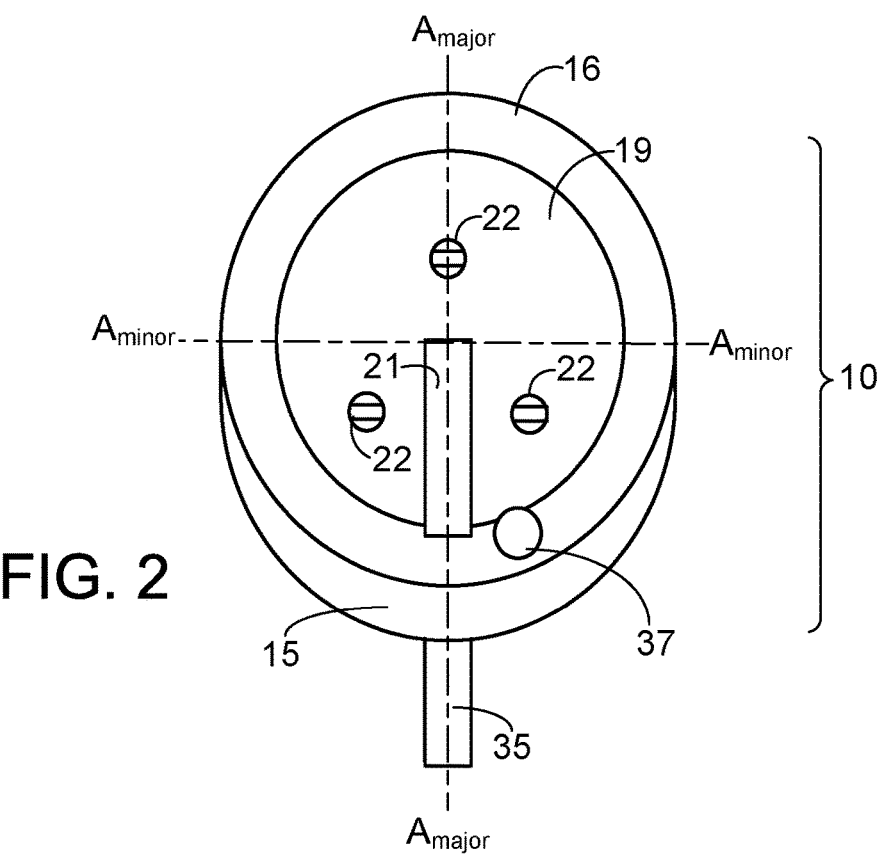
FIG. 2 is a diagram illustrating a plan view, in simplified form, of the drainpipe test plug of FIG. 1 rotated right 90 degrees.

FIG. 1 illustrates a partially-transparent side plan view, in simplified form, of an exemplary implementation of a drainpipe test plug 1. FIG. 2 illustrates a plan view, in simplified form, of the drainpipe test plug of FIG. 1 rotated right 90 degrees. As exemplified in FIGS. 1 and 2 the drainpipe test plug 1 includes a lever arm 11, a plug seal assembly 10, a positioning arm assembly 12, and optionally a fluid fill port 37. The lever arm 11 can be used for various purposes. By way of example but not limitation and as will be described in more detail hereafter, the lever arm 11 may be used to insert the test plug 1 through an opening that is formed in a drainpipe (not shown in FIG. 1 or 2, but shown in FIGS. 8-10) that is being tested. The lever arm 11 may also be used to position the test plug 1 within the drainpipe and then lock the test plug into a plugging position within the drainpipe in order to plug it for testing—as will be appreciated from the more-detailed description that follows, whenever the test plug 1 is in this plugging position a plug seal 13 of the plug seal assembly 10 mechanically seals the drainpipe. Once the testing of the drainpipe has been completed, the lever arm 11 may also be used to unlock the test plug 1 from the plugging position and then lock the test plug into a test fluid bleeding position within the drainpipe in order to allow a test fluid that was introduced into the drainpipe above the test plug to drain out of the drainpipe without the test fluid flowing or splashing out of the opening. As will be described in more detail hereafter, rather than locking the test plug 1 into the just-described test fluid bleeding position within the drainpipe, the test plug may also be left in its plugging position within the drainpipe and the fluid fill port 37 and attached fluid fill hose (not shown) can optionally be used to drain the test fluid out of the drainpipe, again without the test fluid flowing or splashing out of the opening. Once the testing of the drainpipe has been completed and the test fluid has been drained out of the drainpipe, the lever arm 11 may also be used to withdraw the test plug 1 from the drainpipe and the opening, and the opening may then be capped.

Referring again to FIGS. 1 and 2, the lever arm 11 is generally L-shaped and includes a front portion 25 and a rear portion 26, where the front portion 25 is substantially shorter than the rear portion 26. In one implementation of the drainpipe plugging device 1 the front pressure plate 19 includes an arcuate spacing hoop 21 that is rigidly disposed onto the front surface of the plate 19 and extends forwardly thereof, where this spacing hoop 21 has a size and shape that help to accurately position the plug assembly 10 within the drainpipe that is being tested as the plug assembly 10 is being rotated upward within the drainpipe's interior passageway. The plug seal assembly 10 also includes the aforementioned plug seal 13, a front pressure plate 19, and a rear pressure plate 20.

Figure 9:
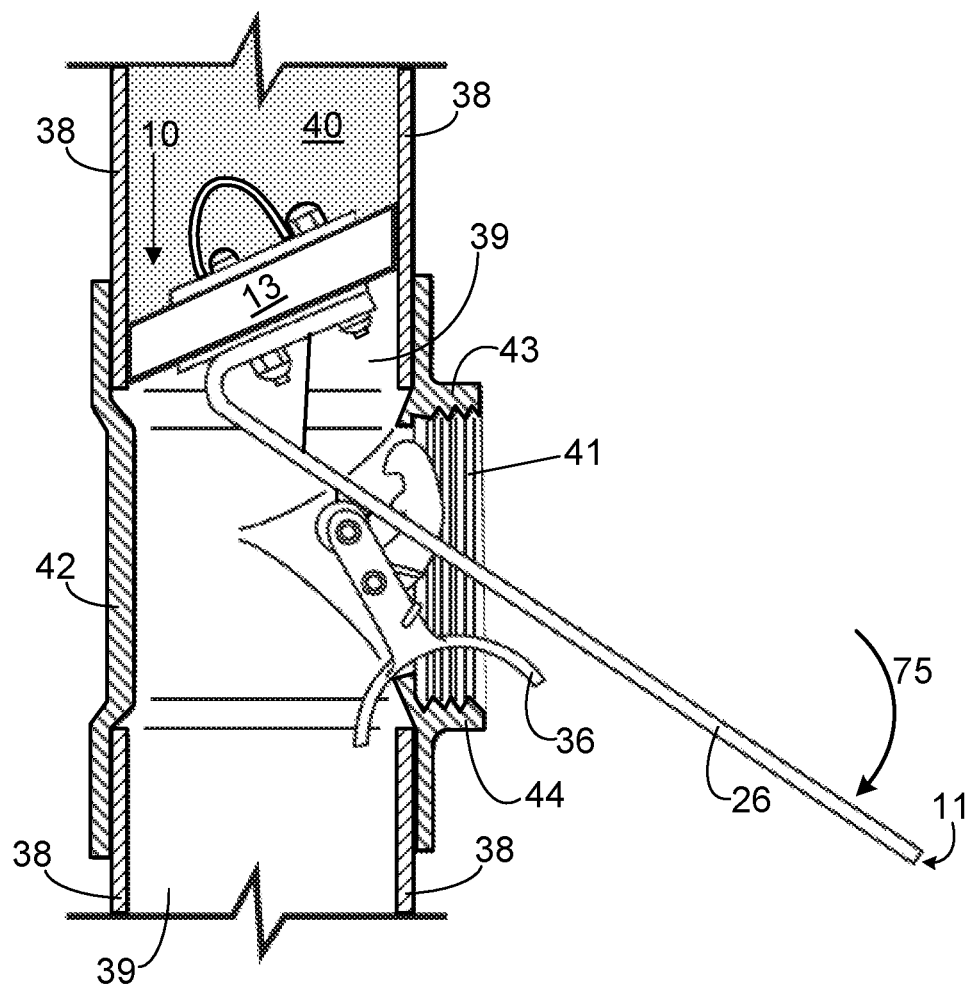
FIG. 9 is a diagram illustrating a partially-cross-sectional side plan view, in simplified form, of the drainpipe test plug of FIG. 1 while it is fully seated and locked into a plugging position within the drainpipe, and after a test fluid has been introduced into the drainpipe above the plugging device so that the plugging device is completely plugging the drainpipe immediately above the opening therein and temporarily preventing the test fluid from flowing beyond the plugging device.

Typically, the conventional drainpipes that are employed in conventional drainpipe systems are circular. However, since the plug seal 13 is designed to fully seat in the pipe at an angle (as best seen in FIG. 9), in tested implementations of the test plug 1 the axially cross-sectional shape of the plug was oval as shown in FIG. 2. However, it is noted that alternate implementations of the plug seal 13 are also possible where the axially cross-sectional shape thereof is circular, or some other shape more suited to the drainpipe. As shown in the exemplary implementation of FIGS. 1 and 2, the plug seal 13 has a prescribed thickness T, as well as an oval cross-sectional shape with a longer diameter along its major axis ($A_{major}$) and a shorter diameter along its minor axis ($A_{minor}$) The plug seal 13 is oversized in that its longer and shorter diameters exceed the diameter of the drainpipe being plugged. For example, in one implementation the plug seal 13 has a minor axis diameter of 4.25 inches and a major axis diameter of 4.5 inches for use in a 4.0 inch diameter drainpipe. It is this oversized condition in combination with the elastomeric material of the plug seal 13 that applies force to create a mechanical seal with the interior wall of the particular drainpipe that is being plugged by the drainpipe test plug 1 when the plug seal 13 is in the aforementioned plugging position within the drainpipe. In other words, the plug seal 13 has a thickness T and axially cross-sectional shape that are designed to allow the plug seal 13 to seat fully and securely within the interior of the drainpipe and completely plug it for testing. As such, the plug seal 13 may have various thicknesses T and various major and minor diameters depending on the diameter of the drainpipe being plugged.

Figure 8:
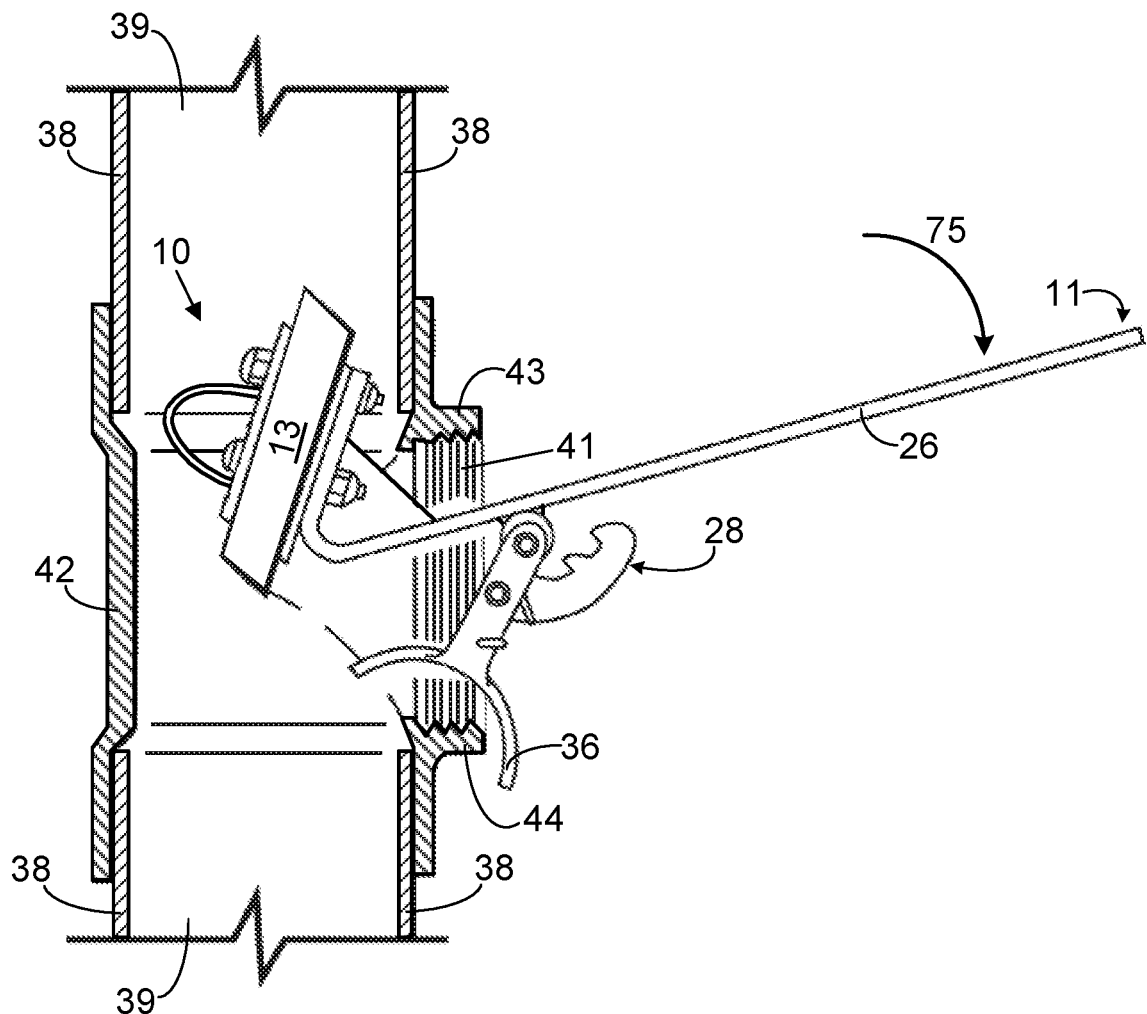
FIG. 8 is a diagram illustrating a partially-cross-sectional side plan view, in simplified form, of the drainpipe test plug of FIG. 1 while it is being inserted into a drainpipe through an opening that is formed in the drainpipe.
Figure 10:
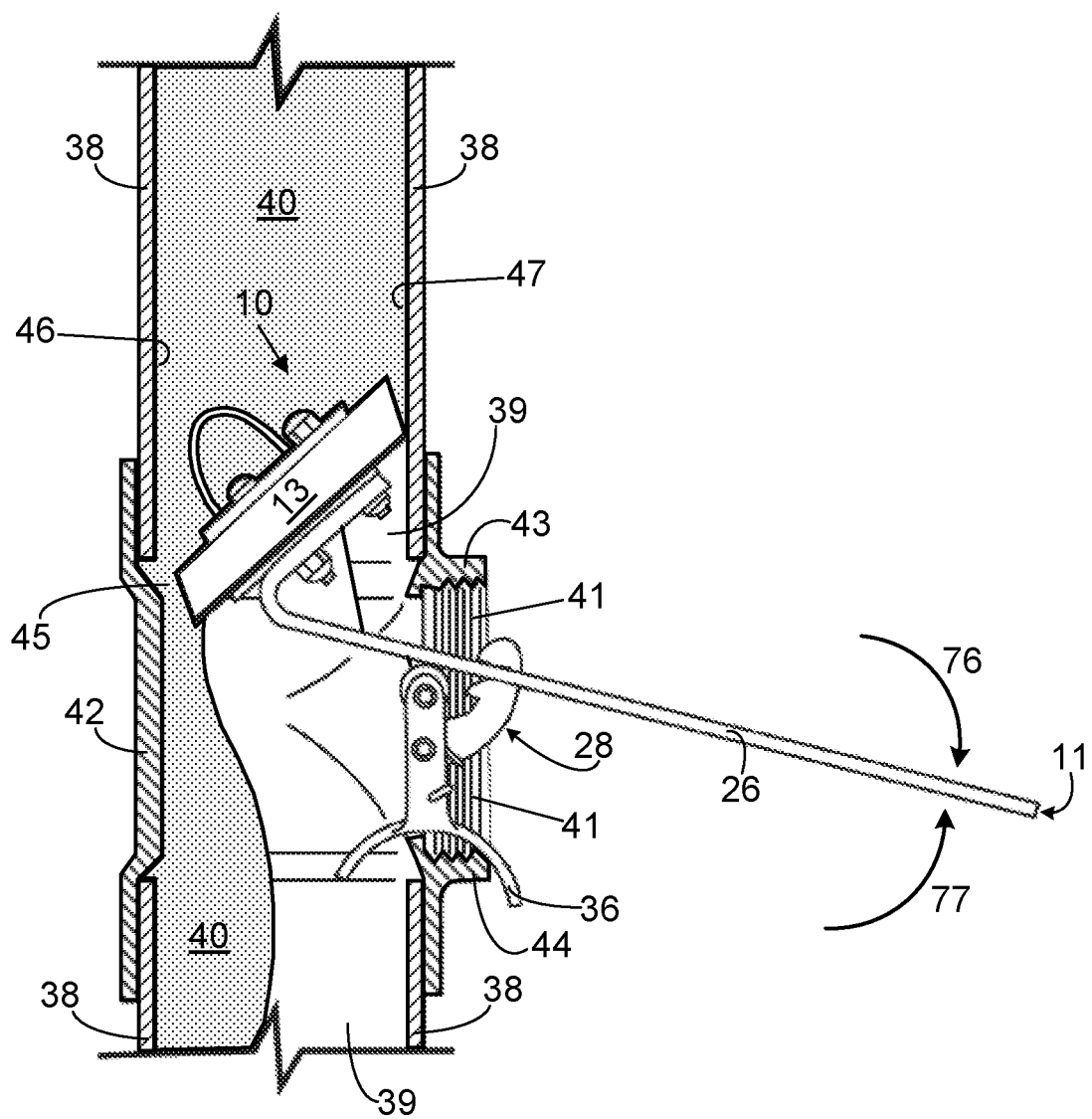
FIG. 10 is a diagram illustrating a partially-cross-sectional side plan view, in simplified form, of the drainpipe test plug of FIG. 1 while it is locked into a test fluid bleeding position within the drainpipe, so that the test plug is allowing the test fluid to slowly flow past the test plug and drain out of the drainpipe after the testing thereof is completed.

Further, the plug seal 13 has a planar front surface 16, a planar rear surface 17 that is substantially parallel to the front surface 16, and a peripheral annular rim 18 (e.g., a peripheral edge surface). The annular rim 18 has a leading end 14 and a trailing end 15. The leading end 14 of the rim 18 slopes rearwardly and downwardly (e.g., at an angle of less than 90 degrees with respect to the front surface 16), and the trailing end 15 of the rim 18 is substantially parallel to the leading end 14 as shown in FIG. 1. Accordingly, the plug seal 13 in side elevation has the shape of a parallelogram as shown in FIG. 1, and also shown in FIGS. 8-10. As shown in FIGS. 8-10 and as will be described in more detail hereafter, this particular configuration of the plug seal 13 optimally facilitates the positioning/maneuvering of the plug seal 13 into and out of the plugging position within the drainpipe. The angle of the rim 18 with respect to the front and rear surfaces 16 and 17 of the plug seal 13 can be any suitable angle that facilitates the plug seating, sealing and fluid draining functions described herein. In tested implementations of the drainpipe test plug 1 the leading end 14 of the rim 18 sloped at an angle of approximately 65-70 degrees with respect to the front surface 16 of the plug seal 13.

Referring again to FIGS. 1 and 2, in one implementation, the front pressure plate 19 has a shape that is substantially the same as the axially cross-sectional shape of the plug seal 13, and has a minor diameter that is less than the axial minor diameter of the plug seal 13. The rear pressure plate 20 also has a shape that is substantially the same as the axially cross-sectional shape of the plug seal 13, and has a minor diameter (not shown) that is also less than the minor axial diameter of the plug seal 13. The front pressure plate 19 is centrally disposed onto the front surface 16 of the plug seal 13, and the rear pressure plate 20 is centrally disposed onto the rear surface 17 of the plug seal 13. Accordingly, the plug seal 13 is centrally sandwiched between the front and rear pressure plates 19 and 20. In one implementation, the plug seal assembly 10 is securely coupled to the front portion 25 of the lever arm 11 using a prescribed number of spaced bolts 22 and the same number of nuts 23, where the shaft of each of the bolts 22 passes completely through the plate 19, the plug seal 13, the plate 20, and the front portion 25 of the lever arm 11, each of the nuts 23 is adapted to threadably fasten onto a different one of the bolts 22. As shown in FIG. 1 the bolts 22 and nuts 23 operate to join the front pressure plate 19, the plug seal 13, the rear pressure plate 20, and the front portion 25 of the lever arm 11 together such that the plug seal 13 is compressed between the plates 19/20 and assumes the same angular position as the front portion 25 of the lever arm 11. It will be appreciated that the plug seal 13 can be changed out to another plug having a different size that is suited to plugging a different drainpipe (e.g., a drainpipe whose interior passageway has a different diameter, or a different cross-sectional shape, or both a different diameter and a different cross-sectional shape) by removing the nuts 23 from the bolts 22 and using them 23/22 to install the other plug into the plug seal assembly. Alternate conventional attachment schemes can also be used to permanently or releasable couple the parts of the plug seal assembly together, as desired.

Referring again to FIGS. 1 and 2, and as will now be described in more detail, the aforementioned positioning arm assembly 12 is rotatably coupled to the rear portion 26 of the lever arm 11 and is adapted to releasably engage with this rear portion 26 and the bottom rim of the aforementioned opening that is formed in the drainpipe that is being tested in order to lock the drainpipe plugging device 1 into its plugging position within the drainpipe. The positioning arm assembly 12 includes a pivot arm 35, a lock arm 28, and a pair of cross-pins 34. The rear portion 26 of the lever arm 11 includes (e.g., defines) a longitudinal slot 24 that passes vertically through this rear portion 26 (e.g., the slot 24 passes from the top of the rear portion 26 to the bottom thereof), and also includes a depending stud 27 that is rigidly disposed onto the bottom of the rear portion 26 between the slot 24 and the front portion 25 of the lever arm 11. The upper end of the pivot arm 35 is rotatably coupled to the depending stud 27 using one of the cross-pins 34, thus allowing the pivot arm 35 to rotate in a vertical plane beneath the rear portion 26 of the lever arm 11. An arcuate foot 36 is rigidly disposed onto the lower end (e.g., the free end) of the pivot arm 35. As will be appreciated from FIGS. 9 and 10 which are described in more detail hereafter, this foot 36 is dimensioned to support the plugging device 1 on the bottom rim of the opening that is formed in the drainpipe. The lower end of the lock arm 28 is rotatably coupled to a point on the pivot arm 35 that is between the arcuate foot 36 and the upper end of the pivot arm 35 using the other one of the cross-pins 34, thus allowing the lock arm 28 to rotate in a vertical plane above the pivot arm 35, where this point is sufficiently close to the upper end of the pivot arm 35 and the lock arm 28 is dimensioned so that the upper portion (e.g., the free end) of the lock arm 28 is able to slidably pass through and releasably engage with the slot 24 in a manner that is described in more detail hereafter. This rotatable coupling of the lock arm 28 and pivot arm 35 can optionally include a spring 31 that is disposed around the pivot arm 35 and the lock arm 28, and acts to bias the lock arm 28 upward toward the slot 24.

Referring to FIG. 1, in one implementation of the drainpipe plugging device 1, the front surface 33 of the upper portion of the lock arm 28 includes a spaced pair of notches therein, namely a leading lock notch 29 and a trailing lock notch 30. The trailing lock notch 30 is dimensioned to releasably engage with the front surface 32 of the longitudinal slot 24 in the rear portion 26 of the lever arm 11 to hold the plugging device 1 in the aforementioned plugging position within the drainpipe that is being tested. The leading lock notch 29 is similarly dimensioned to releasably engage with the front surface 32 of the longitudinal slot 24 in the rear portion 26 of the lever arm 11 to hold/lock the plugging device 1 in the aforementioned test fluid bleeding position within the drainpipe. In another implementation of the drainpipe plugging device (not shown) the front surface 33 of the upper portion of the lock arm 28 includes just a single notch therein, namely the just-described trailing lock notch 30.

FIG. 8 illustrates a partially-cross-sectional side plan view, in simplified form, of the drainpipe plugging device 1 configured without its fluid fill hose while it is being inserted into a drainpipe 38 through an opening 41 that is formed in the drainpipe 38. FIG. 9 illustrates a partially-cross-sectional side plan view, in simplified form, of the plugging device 1 while it is fully seated and locked into a plugging position within the drainpipe 38, and after a test fluid 40 has been introduced into the drainpipe 38 above the plugging device 1, so that the plugging device 1 is completely plugging the drainpipe 38 immediately above the opening 41 and temporarily preventing the test fluid 40 from flowing beyond the plugging device 1. It is noted that the aforementioned fluid fill hose (if employed) is not shown in FIG. 8 or 9 for the sake of being able to better visualize the plugging device 1 within the drainpipe 38. As exemplified in FIG. 8 and referring again to FIG. 1, the opening 41 in the drainpipe 38 is formed on one side thereof by a drain clean-out port 42 that is fitted into the drainpipe 38 and from which a cap (not shown) has been temporarily removed, resulting in the opening 41 having a top rim 43 and a bottom rim 44. A user can insert the plugging device 1 through the opening 41 and into a passageway 39 inside the drainpipe 38 by holding the rear end (e.g., the free end) of the rear portion 26 of the lever arm 11. As the user pushes the rear portion 26 of the lever arm 11 in a downward direction 75 the arcuate foot 36 on the pivot arm 35 will seat on the bottom rim 44 of the clean-out port 42, and the plug seal assembly 10 will be rotated progressively upward in the passageway 39. After the arcuate foot 36 has seated on the bottom rim 44, and as the user continues to push the rear portion 26 of the lever arm 11 in the downward direction 75, the lock arm 28 will be rotated progressively upward into and through the longitudinal slot 24 in the lever arm 11 until the lock arm 28 reaches the position shown in FIG. 9 where the aforementioned trailing lock notch 30 in the lock arm 28 engages with the front surface 32 of the slot 24, thus fully seating the plug seal 13 within the drainpipe 38 and holding/locking the plug seal 13 in the plugging position within the drainpipe 38. As will be appreciated from the foregoing and the more detailed description of FIG. 10 that follows, the aforementioned spring 31 operates to forcibly hold the plug seal 13 in the plugging position until such time as the user pushes the lever arm 11 slightly downward to allow the lock notch 30 to disengage from the front surface 32 of the slot 24.

As exemplified in FIG. 9 and referring again to FIG. 1, when the plug seal 13 is fully seated and held/locked in the plugging position within the drainpipe 38 the plug seal 13 mechanical seals the drainpipe 38 and prevents any test fluid 40 that has been introduced into the drainpipe 38 above the plug seal 13 from flowing beyond the plug seal 13 or out of the opening 41.

FIG. 10 illustrates a partially-cross-sectional side plan view, in simplified form, of the drainpipe plugging device 1 while it is locked into a test fluid bleeding position within the drainpipe 38, so that the plugging device 1 is allowing the test fluid 40 to slowly flow past the plugging device 1 and drain out of the drainpipe 38 after the testing thereof is completed without the test fluid 40 flowing or splashing out of the opening 41. It is noted that the optional fluid fill hose (if employed) is not shown in FIG. 10 for the sake of being able to better visualize the drainpipe plugging device 1 within the drainpipe 38. As exemplified in FIG. 10 and referring again to FIG. 1, after the testing of the drainpipe 38 has been completed the user can push the rear portion 26 of the lever arm 11 slightly downward 76 to allow the trailing lock notch 30 in the lock arm 28 to disengage from the front surface 32 of the slot 24 in the lever arm 11, thus unseating the plug seal 13 within the drainpipe 38. In the case where the lock arm 28 includes the leading lock notch 29, the user can then push the rear portion 26 of the lever arm 11 in an upward direction 77 until the leading lock notch 29 engages with the front surface 32 of the slot 24, thus holding/locking the plug seal 13 in the test fluid bleeding position within the drainpipe 38. As exemplified in FIG. 10, when the plug seal 13 is held/locked in the test fluid bleeding position the leading end 14 of the annular rim 18 of the plug seal 13 still seals off the side 47 of the drainpipe 38 having the opening 41, but the trailing end 15 of the plug's rim 18 has been rotated away from the opposite side 46 of the drainpipe 38 to which the trailing end 15 was previously sealed. It will be appreciated that during this rotation the arcuate spacing hoop 21 serves to cam the trailing end 15 away from the side 46 of the drainpipe 48 while maintaining the leading end's 14 contact with the side 47 of the drainpipe 38. Thus, when the plug seal 13 is in the test fluid bleeding position a fluid drain gap 45 is formed between the plug seal 13 and the side 46 of the drainpipe 38 that is opposite the opening 41, where this gap 45 allows the test fluid 40 to flow past the plug seal 13 and run down the side 46 of the drainpipe 38 that is opposite the opening 41 without the test fluid 40 flowing or splashing out of the opening 41.

In addition to positioning the plug seal 13 into the test fluid bleeding position shown in FIG. 10 in order to drain the test fluid 40 that was introduced into the drainpipe 38, the fluid fill hose (not shown) may also be used to drain the test fluid 40 out of the drainpipe 38 in a safe and controlled manner while the plug seal 13 is positioned in the plugging position shown in FIG. 9. After the test fluid 40 has been completely drained from the drainpipe 38, the user can push the rear portion 26 of the lever arm 11 slightly downward 75/76 to allow both the trailing and leading lock notches 30 and 29 in the lock arm 28 to disengage from the front surface 32 of the slot 24 in the lever arm 11. The user can then push the rear portion 26 of the lever arm 11 in an upward direction 77 until the lock arm 28 slides completely out of the slot 24 as shown in FIG. 8, and withdraw the drainpipe plugging device from the drainpipe 38 and the opening 41.

As described heretofore, the drainpipe test plug implementations described herein can be easily and inexpensively fabricated using a variety of inexpensive but durable materials. For example and referring again to FIG. 1, the arcuate spacing hoop 21 or plate, the front pressure plate 19, the rear pressure plate 20, the lever arm 11, the pivot arm 35, and the lock arm 28 can be made from any of a variety of durable, rigid or semi-rigid materials such as steel (among other types of metals), ceramic, or a high-density polymer, or the like. The plug seal 13 is made from (e.g., formed of) any of a variety of durable, elastomeric (e.g., resiliently flexible), self-supporting materials that are designed to seat fully and securely within the interior wall of a drainpipe to form a mechanical seal therein that is capable of plugging the drainpipe when it is exposed to a wide range of pressures caused by either a test fluid or gas that is introduced into the drainpipe above the plug seal 13—examples of such materials include, but are not limited to, rubber, plastic, or a silicon compound.

1.1 Plug Seal with Holes in the Peripheral Annular Rim

Figure 3:
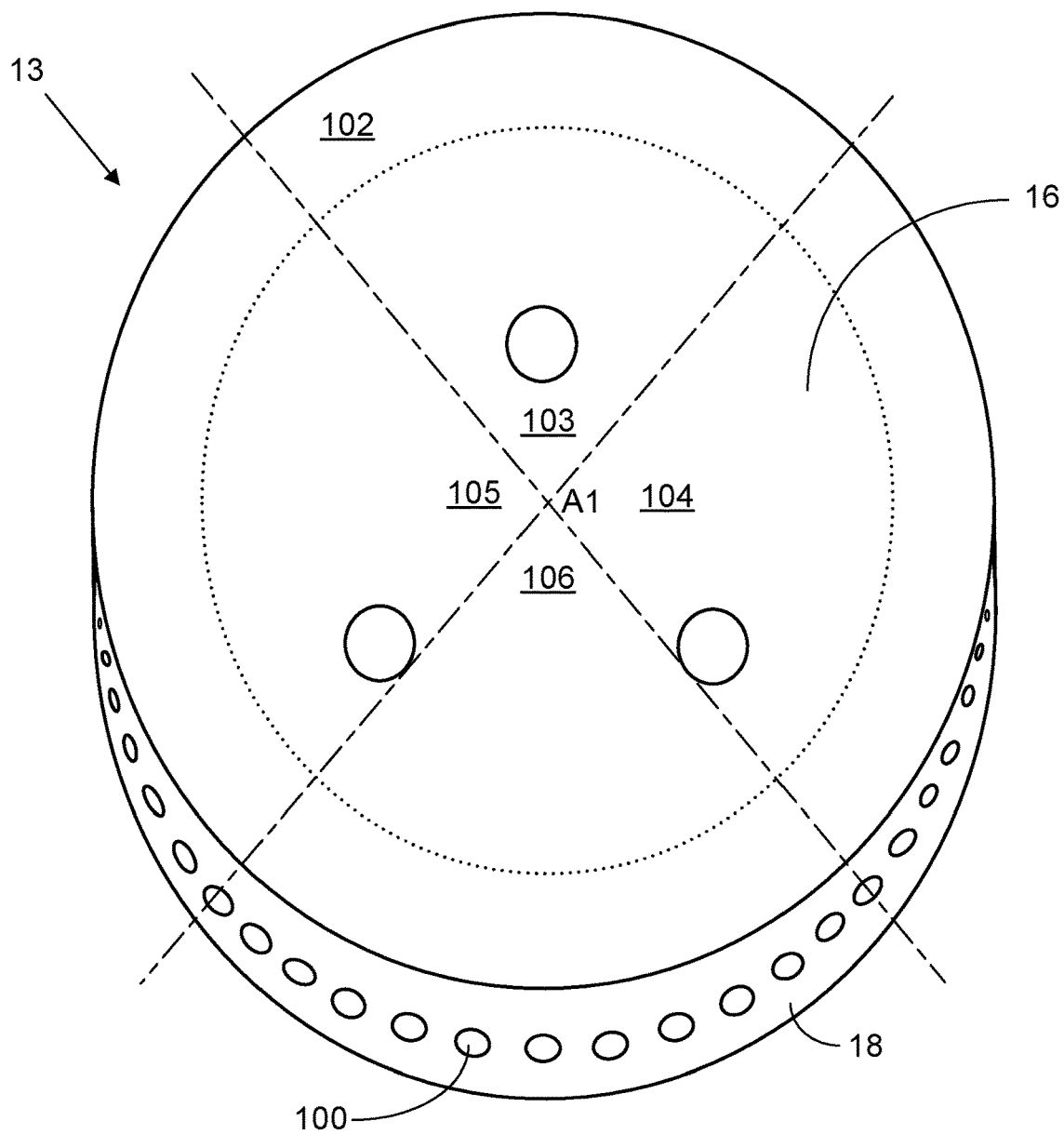
FIG. 3 is a diagram illustrating a plan view, in simplified form, of one implementation of the plug seal of the drainpipe test plug of FIG. 1 with holes formed into the surface of the peripheral annular rim of the plug seal.
Figure 4:
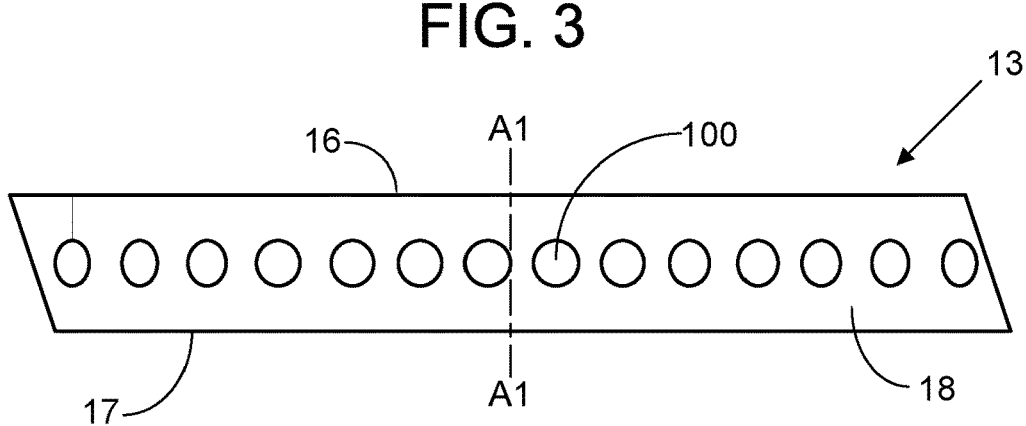
FIG. 4 is a diagram illustrating a plan side view, in simplified form, of the plug seal of FIG. 3.

In one implementation as shown in FIGS. 3 and 4, the plug seal 13 has holes 100 formed into the surface of the peripheral annular rim 18. In the depicted implementation, each hole 100 is centered about midway on the annular rim 18, and extends into the body of the plug seal 13 in a direction approximately parallel to the front surface 16 and rear surface 17 of the plug seal 13 and toward the central axis A1 of the plug. In various other implementations (not depicted), one or more of the holes can be closer to one surface 16, 17 or the other 16, 17, or can extend into the body of the plug at an angle to the front and rear surfaces, or can be directed to a point away from the central axis A1 of the plug. In general, the holes 100 are used to provide a degree of flexibility to the outer periphery area 102 of the plug by allowing the plug material to deform into the holes when the plug periphery is squeezed during insertion into the pipe being plugged. Thus, the plug holes 100 are initially open on both the leading 108 and trailing 110 edges of the plug seal 13 prior to the drainpipe test plug 1 being inserted into the drainpipe 38, and the holes are compressed into a closed or nearly closed state during installation into the drainpipe. The desired degree of flexibility is chosen to facilitate insertion and removal of the drainpipe test plug 1 for a drainpipe 38 being tested using a reasonable amount of force. For example, a reasonable amount of force could be the amount of force that a typical tester would be comfortable in applying to the drainpipe test plug to install or remove it from a drainpipe. However, the degree of flexibility should not be made so flexible that the stiffness of the plug in its peripheral area is degraded to the point that test fluid can leak past the plug during the previously described testing conditions.

Referring again to FIGS. 3 and 4, in one implementation the holes 100 are spaced around the entirety of the peripheral annular rim 18. However, in other implementations, the holes are only formed in portions of the plug. For example, holes can be formed in a leading 103, right side 104, left side 105, or trailing 106 quadrants of the plug, or any combination of quadrants, as long as the desired degree of flexibility in exhibited in the peripheral area 102 of the plug. In one implementation, while the holes 100 can be formed in one or more of the quadrants, the holes are at least formed in the leading quadrant of the plug seal.

Referring to FIGS. 3, 4, 8 and 9, the diameter of the holes 100 need not be any larger that is necessary to close when the drainpipe test plug 1 is fully inserted into the drainpipe 38 being plugged as it is believe any larger diameter would not appreciably increase the flexibility in the peripheral area 102 of the plug. If the holes are made larger, they should not be so large as to jeopardize the durability of the peripheral area of the plug (as could be the case if the holes are close to the front surface or rear surface of the plug), or degrade the stiffness of the plug to the point that test fluid can leak past the plug during the previously described testing conditions. In a tested implementation, the hole diameter was not made larger than half the thickness (T) of the plug seal 13 with satisfactory results when the holes were centered between the front and rear surfaces 16, 17 and extending parallel to these surfaces. The holes 100 can also be made smaller, such that they fully close before the drainpipe test plug 1 is completely inserted, as long as the flexibility in the peripheral area 102 of the plug is not degraded to the point that the plug becomes undesirably difficult to insert.

The spacing of the holes around the periphery of the plug's annular rim 18 is again tied to the goal of achieving a desired degree of flexibility in the outer periphery 102 of the plug. Thus, given a prescribed size (e.g., diameter), depth, location and orientation of the holes, the number of holes and their spacing from one another is chosen so as to achieve the desired degree of flexibility. The holes can be equally spaced or irregularly spaced.

Figure 5:
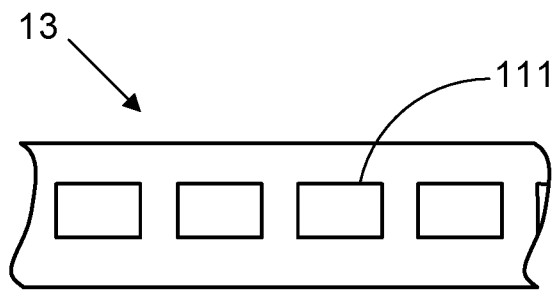
FIG. 5 is a diagram illustrating a partial side view, in simplified form, of one implementation of the plug seal of the drainpipe test plug of FIG. 1 with rectangular cross-sectional holes formed into the surface of the peripheral annular rim of the plug seal.
Figure 6:
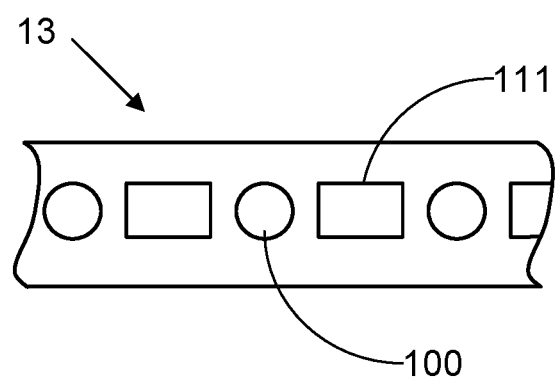
FIG. 6 is a diagram illustrating a partial side view, in simplified form, of one implementation of the plug seal of the drainpipe test plug of FIG. 1 with alternating rectangular cross-sectional holes and circular cross-sectional holes formed into the surface of the peripheral annular rim of the plug seal.
Figure 7:
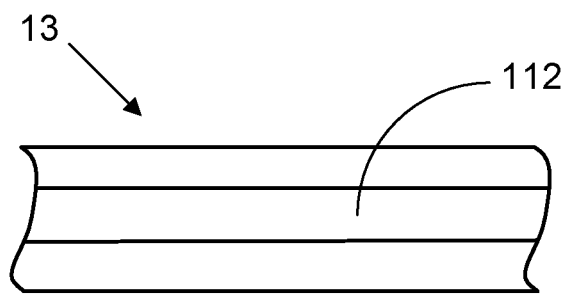
FIG. 7 is a diagram illustrating a partial side view, in simplified form, of one implementation of the plug seal of the drainpipe test plug of FIG. 1 with a continuous channel formed into the surface of the peripheral annular rim of the plug seal.

The holes described so far have a circular cross-section. However, the drainpipe test plug implementations described herein are not limited to circular holes. Rather, any cross-sectional shape can be employed as long as the resulting configuration achieves the desired degree of flexibility. For example, the holes could have a square, or triangular, or oval, or rectangular, or any other desired cross-sectional shape. With regard to oval or rectangular cross-sectional holes (or a combination where a rectangular hole is rounded at the ends of its longer dimension), if the longer dimension is aligned along the plug's annular rim, the holes resemble slots. For example, FIG. 5 depicts a plug seal 13 having rectangular holes 111 that resemble slots. A combination of holes having more than one cross-sectional shape is also envisioned, as exemplified by the plug seal section shown in FIG. 6. The holes could also be replaced with a continuous channel 112 around all or a part of the annular rim, as shown in FIG. 7. The size (e.g., height across the width/thickness of the plug and the length along the annular rim), depth, location, orientation, number and spacing of the holes or channel would still be made such that the desired degree of flexibility is achieved.

In general, any combination of cross-sectional shape, size, depth, location, orientation, number and spacing that provides the desired flexibility in the outer periphery of the plug to accommodate insertion/removal of the drainpipe test plug into the drainpipe being tested can be employed within the scope of the drainpipe test plug implementations described herein. For example, in an exemplary implementation, circular holes are equally spaced about ½ inch apart around the entire annular rim of a ¾ inch thick (T) 4.25 inch minor diameter plug where the holes are ¼ inch in diameter and ⅜ inch deep, are centered about midway between the front and rear surfaces of the plug, and extend into the body of the plug toward the central axis of the plug in a direction approximately parallel to these surfaces. It is believed this exemplary implementation will exhibit an acceptable degree of flexibility.

1.1.1 Lubricated Plug Seal

In one implementation, the plug seal is lubricated to reduce the friction between its peripheral annular rim and the interior surface of the drainpipe. The lubrication further reduces the amount of force required to rotate the drainpipe test plug into the full plugging position. Any conventional grease, oil or wax that will not degrade the elastomeric material of the plug seal can be employed as the lubricant.

The lubricant can be applied by a tester on site prior to installing the plug seal into the drainpipe. In general, the lubricant is loaded into the plurality of holes formed into the surface of the peripheral annular rim of the plug seal. The peripheral annular rim holes also afford an opportunity to load the lubricant ahead of time and so eliminate having to lubricate the seal plug on site. The drainpipe test plug could even be pre-loaded with lubricant during its manufacture. This allows the test plug to be ready for use right out of the box.

In another implementation, the plug seal is lubricated by making it from a lubricant-infused elastomeric material. Such materials exhibit a slippery outer surface. The advantage of this implementation is that the lubricant does not need to be applied on site or preloaded into the peripheral annular rim holes. Rather, the drainpipe test plug is ready for use each time it is employed.

1.2 Plug Seal with Holes in the Planar Front Surface and Pressure Assisted Sealing As is appreciated in the art of plumbing systems, typical local building codes require a given building's drainpipe system to withstand a pressure of 15-17 psi for 24 hours. This 15-17 psi pressure is approximately equivalent to the back pressure produced at the base of a three-story drainpipe that is completely filled to its top with water. However, in some testing scenarios higher pressures are employed in testing a building's drainpipe system.

Referring to FIGS. 1 and 2, it will be appreciated that when the plug seal assembly 10 is in the plugging position the pressure that is applied to the front pressure plate 19 and the planar front surface 16 of the plug seal 13 by the test fluid will compress the plug seal 13 against the rear pressure plate 20 and the front portion 25 of the lever arm 11, thus causing a corresponding radial expansion of the plug seal 13 which increases the force the plug seal 13 applies to the interior wall of the drainpipe 38 and enhances the mechanical seal created by the plug seal 13. However, in some instances when higher pressures are applied by the test fluid, it has been observed that some of the fluid leaks past the plug seal, particularly at its leading end 14.

Implementations of the drainpipe test plug can be configured to provide both flexibility in the outer periphery of the plug seal and pressure assisted sealing. This pressure assisted sealing, as will be appreciated by the description to follow, assists in preventing fluid leaks past the plug seal even when higher pressures are applied during drainpipe testing.

Figure 11:
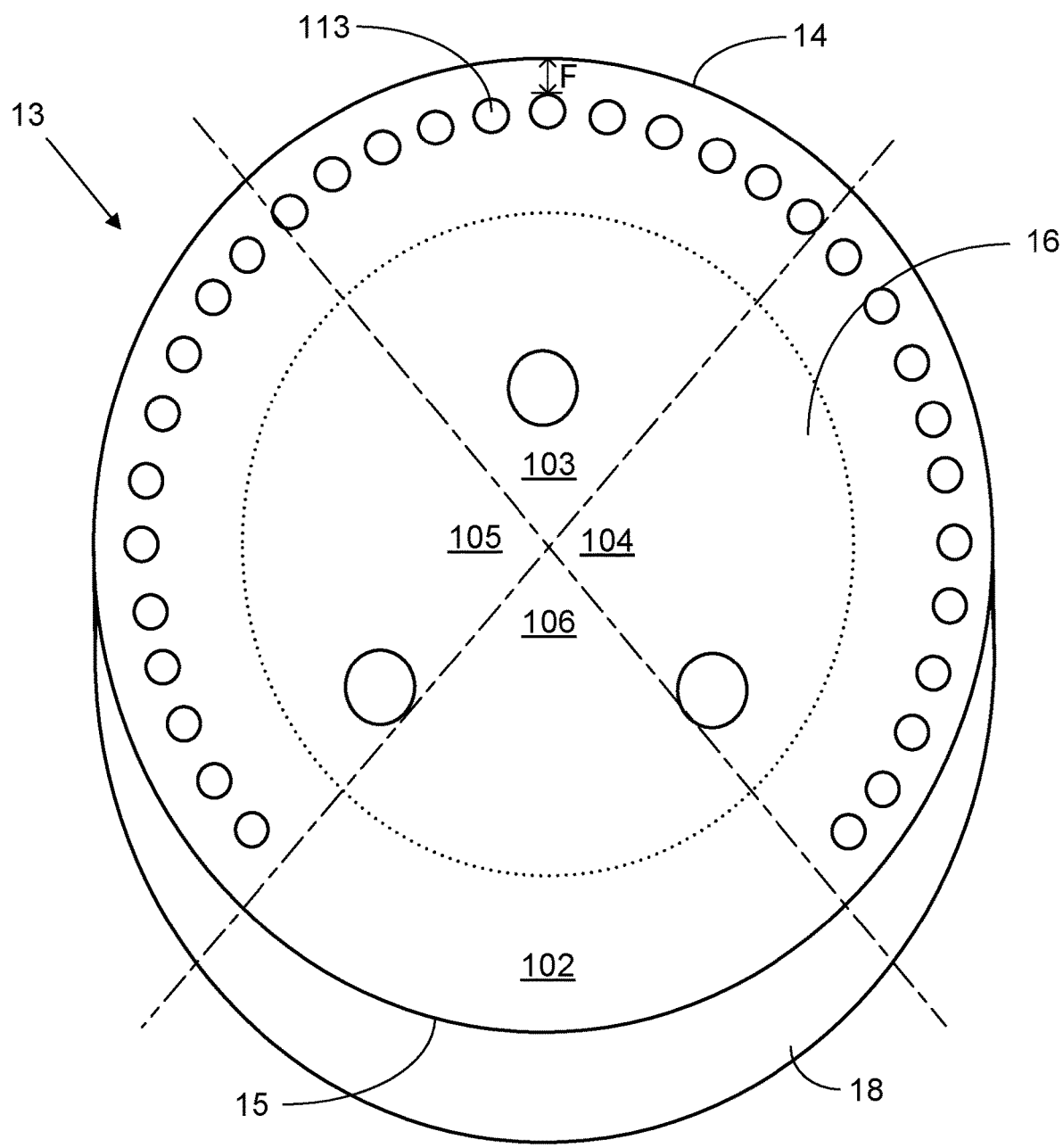
FIG. 11 is a diagram illustrating a plan view, in simplified form, of one implementation of the plug seal of the drainpipe test plug of FIG. 1 with holes formed into three quadrants of the front surface in the peripheral area of the plug seal.

In one implementation, as shown in FIG. 11, holes 113 are formed in the front surface 16 in the peripheral area 102 of the plug seal 13. In the depicted implementation, the holes 113 are formed in a curved pattern that follows the edge of the front surface 16 at a distance F in from the edge. The holes 113 extend into the body of the plug seal 13 in a direction approximately perpendicular to the front surface 16. In various other implementations (not depicted), one or more of the holes can be closer or further away from the edge of the front surface and do not necessarily form a curve. In addition, in other implementation, one or more of the holes are not perpendicular to the front surface, but rather extend into the body of the plug seal at an angle to the front surface. Referring again to FIG. 11, in one implementation the holes 113 are spaced around the periphery of the plug seal 13 in the leading 103, right side 104 and left side 105 quadrants of the plug seal. There are no such holes in the trailing 106 quadrant. However, in other implementations, the holes can be formed in the leading 103, right side 104, left side 105, or trailing 106 quadrants of the plug, or any combination of quadrants, as long as the desired degree of flexibility in exhibited in the peripheral area 102 of the plug. In one implementation, while the holes 113 can be formed in one or more of the quadrants, the holes are at least formed in the leading quadrant of the plug seal.

In general, the holes 113 provide a degree of flexibility to the outer periphery area 102 of the plug seal 13 by allowing the plug material to deform into the holes when the plug seal periphery is squeezed during insertion into the pipe being plugged. Thus, as the plug seal assembly is rotated into its plugging position within the drainpipe, the plug holes in the leading, right side and left side quadrants are initially compressed into a closed or partially closed state to varying degrees (owing to the smaller plug seal diameter from side to side in comparison with the diameter from front to back). Once the plug seal assembly is past half-way to its plugging position within the drainpipe, the plug holes start to reopen to varying degrees. In particular, the holes in the leading quadrants open either fully, or to a significant degree. The holes in the right side and left side quadrants remain completely or partially closed The desired degree of flexibility is chosen to facilitate insertion and removal of the drainpipe test plug for a drainpipe being tested using a reasonable amount of force, as described previously.

The significance of the open or nearly open holes in the leading quadrant of the plug seal is that the holes assist in preventing test fluid from leaking past the plug seal at its leading end. More particularly, referring to FIG. 12, the leading end 14 of the plug seal's rim 18 is shown against the interior surface of the drainpipe 38 when it is in full plugging position. The test fluid 40 fills the holes 113 (one of which is shown in cross-section in FIG. 12) and pushes against the side walls 115 of the holes. This pushing force on the sidewall of the holes 113 has the effect of forcing the leading end 14 of the plug seal's rim 18 against the interior surface of the drainpipe 38 to a greater degree than without the holes. In fact, the greater the fluid pressure is in the drainpipe, the greater the force imparted by the holes onto the interior surface of the drainpipe. It is believed that this added force assists in preventing test fluid from leaking past the plug seal 13 at its leading end 14.

Figure 12:
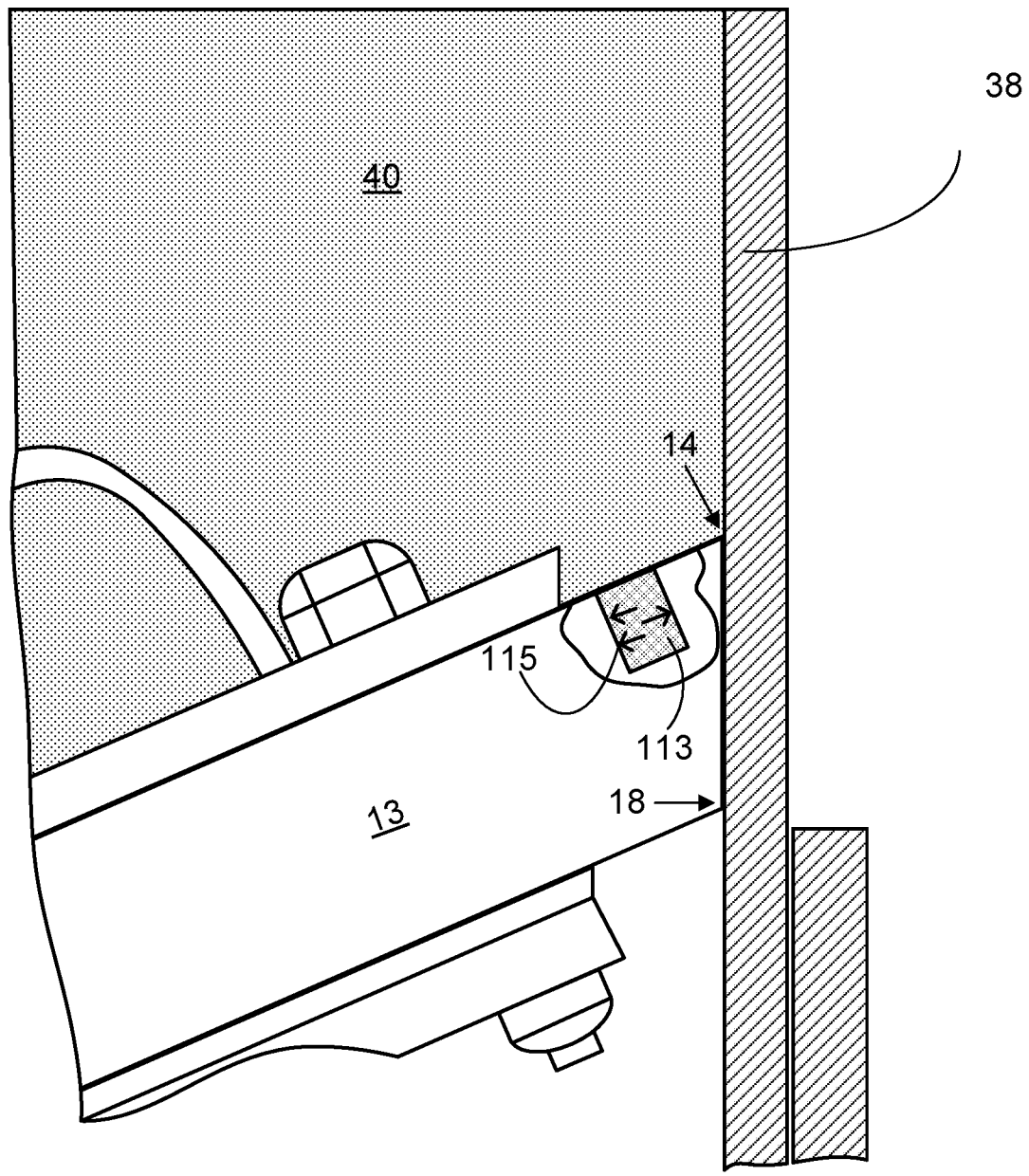
FIG. 12 is a diagram illustrating a partially-cross-sectional partial side plan view, in simplified form, of the drainpipe test plug of FIG. 1 while it is fully seated and locked into a plugging position within the drainpipe, and after a test fluid has been introduced into the drainpipe above the plugging device, and with a partial cut-away view of the plug seal showing one of the test-fluid-filled holes formed into the front surface of the plug seal.

Referring to FIGS. 11 and 12, the diameter of the holes 113 need not be any larger that is necessary to close as the drainpipe test plug 1 is inserted into the drainpipe 38 being plugged as it is believe any larger diameter would not appreciably increase the flexibility in the peripheral area 102 of the plug. If the holes are made larger (for example to increase the added sealing force the holes provide), they should not be so large as to jeopardize the durability of the peripheral area of the plug, or degrade the stiffness of the plug to the point that test fluid can leak past the plug seal during testing conditions despite the assistance the holes provide in forcing the leading end of the plug seal's rim against the interior surface of the drainpipe. The holes 113 can also be made smaller, such that they fully close before the drainpipe test plug 1 is completely inserted, as long as the flexibility in the peripheral area 102 of the plug is not degraded to the point that the plug becomes undesirably difficult to insert.

Figure 13:
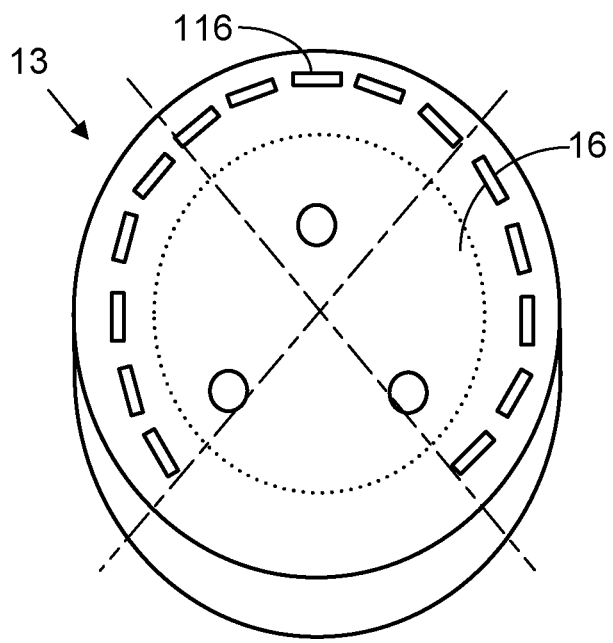
FIG. 13 is a diagram illustrating a plan view, in simplified form, of one implementation of the plug seal of the drainpipe test plug of FIG. 1 with rectangular cross-sectional holes formed into three quadrants of the front surface in the peripheral area of the plug seal.
Figure 14:
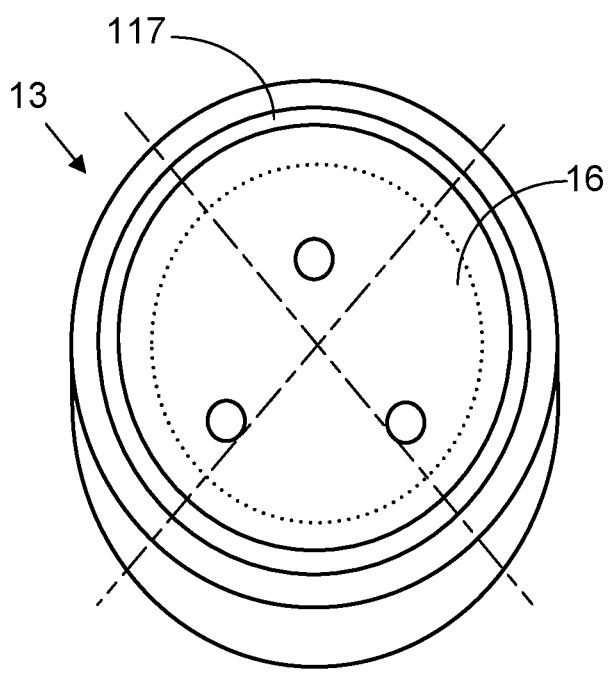
FIG. 14 is a diagram illustrating a plan view, in simplified form, of one implementation of the plug seal of the drainpipe test plug of FIG. 1 with a continuous channel formed into the front surface in the peripheral area of the plug seal.
Figure 15:
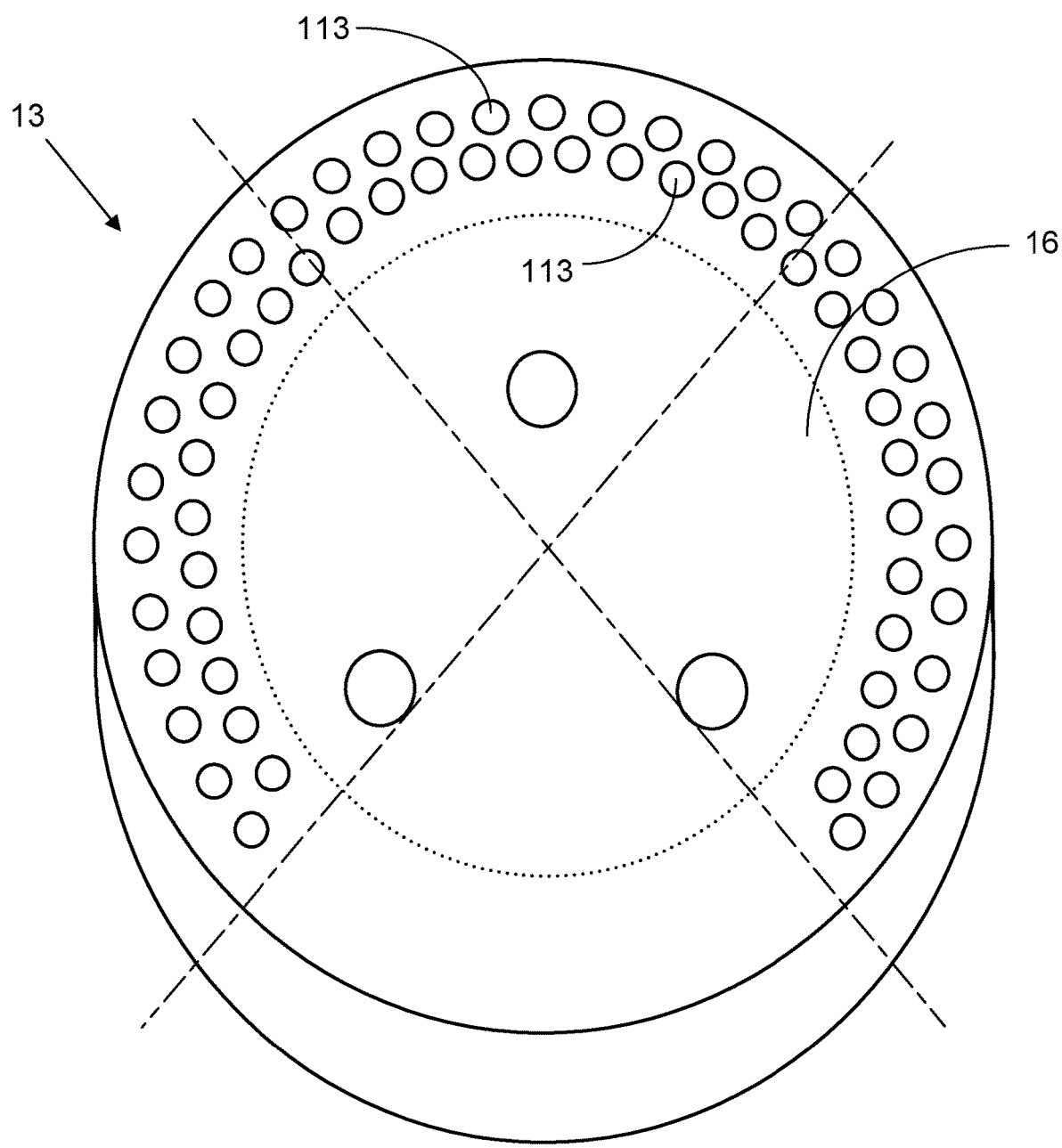
FIG. 15 is a diagram illustrating a plan view, in simplified form, of one implementation of the plug seal of the drainpipe test plug of FIG. 1 with two rows of holes formed into three quadrants of the front surface in the peripheral area of the plug seal.

The holes described so far have a circular cross-section. However, the drainpipe test plug implementations described herein are not limited to circular holes. Rather, any cross-sectional shape can be employed as long as the resulting configuration achieves the desired degree of flexibility while providing enough added sealing force to prevent the test fluid from leaking past the leading end of the plug seal's rim. For example, the holes could have a square, or triangular, or oval, or rectangular, or any other desired cross-sectional shape. A combination of holes having more than one cross-sectional shape is also envisioned. With regard to oval or rectangular cross-sectional holes (or a combination where a rectangular hole is rounded at the ends of its longer dimension), if the longer dimension is aligned along the edge on the front surface, the holes resemble slots. For example, FIG. 13 depicts a plug seal 13 having rectangular slot-like holes 116. The holes could also be replaced with a continuous channel 117 that is formed around all (as shown in FIG. 14), or a part of the edge on the front surface 16. Still further, two or more "rows" of holes (or channels) can be employed. For example, FIG. 15 depicts an implementation having two rows of holes 113. In general, each additional curved rows of holes (or channels) formed into the surface of the planar front surface of the plug seal can follow the edge of the front surface at a prescribed distance in from the more outwardly adjacent curved row of holes (or channels).

The cross-sectional size (e.g., diameter) and shape (e.g., circular), depth, location and orientation of the holes, as well as the number of holes and their spacing from one another, will determine both the degree of flexibility and the amount of added sealing force the holes provide. As such, these factors are chosen to achieve a desired degree of flexibility while providing enough added sealing force to prevent the test fluid from leaking past the leading end of the plug seal's rim. For example, in an exemplary implementation, circular holes are equally spaced in a curved pattern about ¼ inch apart around the leading, right side and left side quadrants about ½ inch back from the edge on the front surface of a 4.25 inch minor diameter plug seal. The holes are ¼ inch in diameter and ½ inch deep (in a 1 inch thick plug seal) and extend perpendicularly into the body of the plug from the front surface. It is believed this exemplary implementation will exhibit an acceptable degree of flexibility and enough added sealing force to prevent the test fluid from leaking past the leading end of the plug seal's rim.

It is further noted that the cross-sectional size and shape, depth, orientation and spacing of the holes can vary from one hole to another. For example, the depth of the holes can be made deeper in the leading quadrant of the plug to increase their surface area and so increase the added sealing force in that quadrant, as long as the holes are not so deep that they jeopardize the durability of the peripheral area of the plug seal, or degrade the stiffness of the plug to the point that test fluid can leak past the plug seal during testing conditions despite the assistance the holes provide in forcing the leading end of the plug seal's rim against the interior surface of the drainpipe.

1.3 Plug Seal with Holes in the Peripheral Annular Rim and in the Planar Front Surface Implementations of the drainpipe test plug described herein can also employ a plug seal that combines the previously described holes formed into the surface of the peripheral annular rim with the holes formed in the front surface of the plug seal. Such implementations would enjoy the benefits of the flexibility in the outer periphery of the plug seal afforded by the peripheral annular rim holes and the front surface holes, as well as the pressure assisted sealing afforded by the front surface holes. In the combined implementations, the cross-sectional hole size (e.g., diameter) and shape (e.g., circular), depth, location and orientation of the holes, as well as the number of holes and their spacing from one another, will determine both the degree of flexibility and the amount of added sealing force the holes provide. As such, these factors are chosen to achieve a desired degree of flexibility while providing enough added sealing force to prevent the test fluid from leaking past the leading end of the plug seal's rim.

Figure 16:
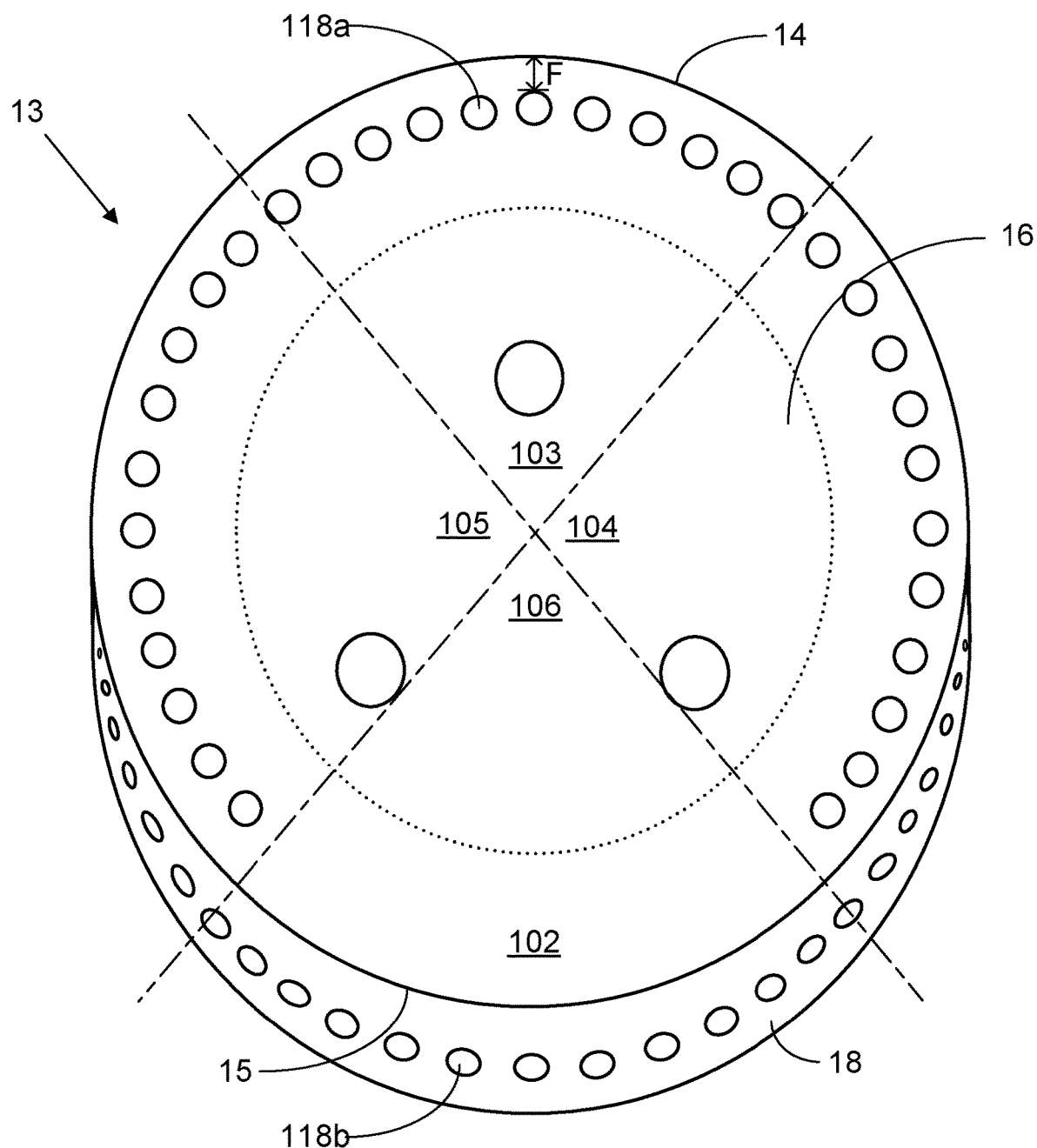
FIG. 16 is a diagram illustrating a plan view, in simplified form, of one implementation of the plug seal of the drainpipe test plug of FIG. 1 with holes formed into three quadrants of the front surface in the peripheral area of the plug seal and holes formed into the surface of the peripheral annular rim of the plug seal.

An exemplary implementation of the foregoing combined plug seal is shown in FIG. 16. The exemplary implementation includes holes 118*a* that are formed in and spaced around the annular rim of the plug seal 13, as well as holes 118*b* that are formed in the peripheral area 102 of the front surface 16 and spaced around the periphery in the leading 103, right side 104 and left side 105 quadrants of the plug seal. In the depicted implementation, the holes 118*a* are centered about midway on the annular rim 18, and extends into the body of the plug seal 13 in a direction approximately parallel to the front surface 16 of the plug seal 13 and toward the central axis of the plug. Alternate configurations of the holes 118*a* (not depicted) described previously could be employed instead. Holes 118*b* are formed in a curved pattern that follows the edge of the front surface 16 at a distance F in from the edge. The holes 118*b* extend into the body of the plug seal 13 in a direction approximately perpendicular to the front surface 16. Alternate configurations of the holes 118*b* (not depicted) described previously could be employed instead.

2.0 Other Implementations

While the drainpipe test plug has been described by specific reference to implementations thereof, it is understood that variations and modifications thereof can be made without departing from the true spirit and scope of the drainpipe test plug. By way of example but not limitation, it is possible to employ a prescribed test gas (such as air or any other desired type of gas) for the drainpipe testing rather than a fluid. In this case the top of the drainpipe will be capped off to make the portion of the drainpipe between the cap and the plug of the drainpipe plugging device air-tight (assuming there are no leaks in this portion). The drainpipe testing method will generally be the same except that the test fluid supply source is replaced with an air/gas supply source, and the drainpipe is pressurized to a desired pressure using the air/gas that is introduced via the fill hose into the drainpipe above the plug.

It should also be recognized that the interface between the various components of the drainpipe test plug implementations can employ alternate conventional joining methods where appropriate, such as via bolts, welds, rivets, adhesives, or screws, among other types of joining methods.

It is noted that any or all of the implementations that are described in the present document and any or all of the implementations that are illustrated in the accompanying drawings may be used and thus claimed in any combination desired to form additional hybrid implementations. In addition, although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What has been described above includes example implementations. It is, of course, not possible to describe every conceivable combination of components or methodologies for purposes of describing the claimed subject matter, but one of ordinary skill in the art may recognize that many further combinations and permutations are possible. Accordingly, the claimed subject matter is intended to embrace all such alterations, modifications, and variations that fall within the spirit and scope of the appended claims.

The aforementioned implementations have been described with respect to interaction between several components. It will be appreciated that such implementations and components can include those components or specified sub-components, some of the specified components or sub-components, and/or additional components, and according to various permutations and combinations of the foregoing. Sub-components can also be implemented as components coupled to other components rather than included within parent components (e.g., hierarchical components).

Wherefore, what is claimed is:

1. A drainpipe test plug for temporarily plugging a drainpipe via an opening formed in the drainpipe, comprising:
   a lever arm comprising a front portion and a rear portion;
   a positioning arm assembly that is rotatably coupled to the rear portion of the lever arm and is adapted to releasably engage with the rear portion of the lever arm and a bottom rim of the opening in order to lock the drainpipe test plug into a plugging position;
   a plug seal assembly that is securely coupled to the front portion of the lever arm and which mechanically seals the drainpipe whenever the drainpipe test plug is in the plugging position within the drainpipe, said plug seal assembly comprising a plug seal having a planar front surface which faces upward in the drainpipe whenever the drainpipe test plug is in the plugging position, a planar rear surface that is substantially parallel to the planar front surface and a peripheral annular rim, and wherein the plug seal comprises a plurality of holes formed into the surface of the peripheral annular rim that extend into a peripheral area of the plug seal and that have only one opening to the exterior of the plug seal, and which impart a degree of flexibility to the peripheral area of the plug seal to facilitate the insertion and removal of the drainpipe test plug from the drainpipe without jeopardizing the durability of the peripheral area of the plug seal or degrading the stiffness of the plug seal to the point that test fluid leaks past the plug seal whenever the drainpipe test plug is locked into the plugging position.

2. The drainpipe test plug of claim 1, wherein the peripheral annular rim of the plug seal comprises a leading end, and a trailing end that is substantially parallel to the leading end, wherein the leading end slopes at an angle of less than 90 degrees with respect to the planar front surface.

3. The drainpipe test plug of claim 2, wherein said angle has a value greater than or equal to 65 degrees and less than or equal to 70 degrees.

4. The drainpipe test plug of claim 2, wherein the plug seal assembly further comprises:
   a front pressure plate comprising a shape that is substantially the same as an axially cross-sectional, shape of the plug, and a diameter that is less than an axial diameter of the plug, the front pressure plate being centrally disposed onto the planar front surface; and
   a rear pressure plate also comprising the shape that is substantially the same as the axially cross-sectional shape of the plug, and another diameter that is less than the axial diameter of the plug, the rear pressure plate being centrally disposed onto the planar rear surface,
   said secure coupling of the plug seal assembly to the front portion of the lever arm being accomplished using a prescribed number of spaced bolts and the same number of nuts, a shaft of each of the bolts passing completely through the front pressure plate, the plug, the rear pressure plate, and the front portion of the lever arm, each of the nuts being adapted to threadably fasten onto a different one of the bolts,
   the plug thus being compressed between the front and rear pressure plates and assuming an angular position that is the same as the front portion of the lever arm.

5. The drainpipe test plug of claim 1, wherein the peripheral annular rim of the plug seal has a prescribed thickness, and wherein each of the plurality of holes formed into the surface of the peripheral annular rim is centered midway with respect to the thickness of the peripheral annular rim and extends into the body of the plug seal in a direction approximately parallel to the front surface and rear surface of the plug seal.

6. The drainpipe test plug of claim 1, wherein the plug seal comprises a leading quadrant, a right side quadrant, a left side quadrant and a trailing quadrant, wherein the leading quadrant of the test plug contacts the interior surface of the drainpipe on a same side as the opening formed in the drainpipe, and wherein the plurality of holes are formed into the surface of the peripheral annular rim at least in the leading quadrant of the test plug.

7. The drainpipe test plug of claim 1, wherein the plurality of holes formed into the surface of the peripheral annular rim comprise a cross-sectional shape and size, depth, location, orientation, number, and spacing that in combination impart said degree of flexibility to a peripheral area of the plug seal that facilitates the insertion and removal of the drainpipe test plug from the drainpipe without jeopardizing the durability of the peripheral area of the plug seal or degrading the stiffness of the plug seal to the point that test fluid leaks past the plug seal whenever the drainpipe test plug is locked into the plugging position.

8. The drainpipe test plug of claim 1, wherein the plurality of holes formed into the surface of the peripheral annular rim each exhibit a cross-sectional shape comprising a circle, or square, or triangle, or oval, or rectangle, or combination thereof.

9. The drainpipe test plug of claim 1, wherein the peripheral annular rim has a thickness in a direction perpendicular to the planar front surface, and wherein the plurality of holes formed into the surface of the peripheral annular rim each exhibit a size in the direction perpendicular to the planar front surface that is one-half the thickness of the peripheral annular rim or less.

10. The drainpipe test plug of claim 1, wherein the plurality of holes formed into the surface of the peripheral annular rim are equidistantly spaced apart.

11. The drainpipe test plug of claim 1, further comprising a lubricant which is loaded into the plurality of holes formed into the surface of the peripheral annular rim of the plug seal prior to the drainpipe test plug being inserted into the drainpipe.

12. The drainpipe test plug of claim 1, wherein the plug seal is made from a lubricant-infused elastomeric material.

13. The drainpipe test plug of claim 1, wherein the plug seal comprises a leading quadrant, a right side quadrant, a left side quadrant and a trailing quadrant, said leading quadrant of the test plug contacting the interior surface of the drainpipe on a same side as the opening formed in the drainpipe whenever the drainpipe test plug is in the plugging position, and wherein the plug seal further comprises a plurality of holes formed into the surface of the planar front surface at least in the leading quadrant of the test plug, and wherein the holes impart an additional degree of flexibility to a peripheral area of the plug seal to facilitate the insertion and removal of the drainpipe test plug from the drainpipe while providing additional sealing force against the interior of the drainpipe whenever the drainpipe test plug is in the plugging position to prevent test fluid in the drainpipe above the drainpipe test plug from leaking past the plug seal and without jeopardizing the durability of the peripheral area of the plug seal.

14. The drainpipe test plug of claim 13, wherein the plurality of holes formed into the surface of the planar front surface of the plug seal are formed in a curved row that follows the edge of the front surface at a prescribed distance in from the edge, and wherein each of the holes extends into the body of the plug seal in a direction perpendicular to the front surface of the plug seal.

15. The drainpipe test plug of claim 13, wherein the plurality of holes formed into the surface of the planar front surface of the plug seal comprise a cross-sectional shape and size, depth, location, orientation, number, and spacing that collectively, and in in combination with the plurality of holes formed into the surface of the peripheral annular rim, impart the degree of flexibility to a peripheral area of the plug seal to facilitate the insertion and removal of the drainpipe test plug from the drainpipe while providing additional sealing force against the interior of the drainpipe whenever the drainpipe test plug is in the plugging position to prevent test fluid in the drainpipe, above the drainpipe test plug from leaking past the plug, seal and without jeopardizing the durability of the peripheral area of the plug seal.

16. The drainpipe test plug of claim 13, wherein the plurality of holes formed into the surface of the planar front surface of the plug seal each exhibit a cross-sectional shape comprising a circle, or square, or triangle, or oval, or rectangle, or combination thereof.

17. The drainpipe test plug of claim 13, wherein the plurality of holes formed into the surface of the planar front surface at least in the leading quadrant of the test plug are sized to ensure the holes are substantially open whenever the drainpipe test plug is in the plugging position.

18. The drainpipe test plug of claim 13, wherein, the plurality of holes formed into the surface of the planar front, surface of the plug seal are equidistantly spaced apart.

19. A drainpipe test plug for temporarily plugging a drainpipe via an opening formed in the drainpipe, comprising:
a lever arm comprising a front portion and a rear portion;
a positioning arm assembly that is rotatably coupled to the rear portion of the lever arm and is adapted to releasably engage with the rear portion of the lever arm and a bottom rim of the opening in order to lock the drainpipe test plug into a plugging position;
a plug seal assembly that is securely coupled to the front portion of the lever arm and which mechanically seals the drainpipe whenever the drainpipe test plug is locked into the plugging position within the drainpipe, said plug seal assembly comprising, a plug seal having a planar front surface which faces upward in the drainpipe whenever the drainpipe test plug is in the plugging position, a planar rear surface that is substantially parallel to the planar front surface and a peripheral annular rim, and wherein the plug seal comprises a leading quadrant, a right side quadrant, a left side quadrant and a trailing quadrant, said leading quadrant of the test plug contacting the interior surface of the drainpipe on a same side as the opening formed in the drainpipe whenever the drainpipe test plug is in the plugging position, and wherein the plug seal comprises a plurality of holes formed into the surface of the planar front surface at least in the leading quadrant of the test plug, and wherein the holes impart a degree of flexibility to a peripheral area of the plug seal to facilitate the insertion and removal of the drainpipe test plug from the drainpipe while providing additional sealing force against the interior of the drainpipe whenever the drainpipe test plug is in the plugging position to prevent test fluid in the drainpipe above the drainpipe test plug from leaking past the plug seal and without jeopardizing the durability of the peripheral area of the plug seal.

20. The drainpipe test plug of claim 19, wherein the peripheral annular rim of the plug seal comprises a leading end, and a trailing end that is substantially parallel to the leading end, wherein the leading end slopes at an angle of less than 90 degrees with respect to the planar front surface.

21. The drainpipe test plug of claim 20, wherein said angle has a value greater than or equal to 65 degrees and less than or equal to 70 degrees.

22. The drainpipe test plug of claim 20, wherein the plug seal assembly further comprises:
a front pressure plate comprising a shape that is substantially the same as an axially cross-sectional shape of the plug, and a diameter that is less than an axial diameter of the plug, the front pressure plate being centrally disposed onto the planar front surface; and
a rear pressure plate also comprising the shape that is substantially the same as the axially cross-sectional shape of the plug, and another diameter that is less than the axial diameter of the plug, the rear pressure plate being centrally disposed onto the planar rear surface,
said secure, coupling of the plug seal assembly to the front, portion of the lever arm being accomplished using a prescribed number of spaced bolts and the same number of nuts, a shaft of each of the bolts passing completely through the front pressure plate, the plug, the rear pressure plate, and the front portion of the lever arm, each of the nuts being adapted to threadably fasten onto a different one of the bolts,
the plug thus being compressed between the front and rear pressure plates and assuming an angular position that is the same as the front portion of the lever arm.

23. The drainpipe test plug of claim 19, wherein the plurality of holes formed into the surface of the planar front surface of the plug seal are formed in a curved row that follows the edge of the front surface at a prescribed distance in from the edge, and wherein each of the holes extends into the body of the plug seal in a direction perpendicular to the front surface of the plug seal.

24. The drainpipe test plug of claim 19, wherein the plurality of holes formed into the surface of the planar front surface of the plug seal comprise a cross-sectional shape and size, depth, location, orientation, number, and spacing that in combination impart the degree of flexibility to a peripheral area of the plug seal to facilitate the insertion and removal of the drainpipe test plug, from the drainpipe while providing additional sealing force against the interior of the drainpipe whenever the drainpipe test plug is in the plugging position to prevent test fluid in the drainpipe above the drainpipe test plug from leaking past the plug seal and without jeopardizing the durability of the peripheral area of the plug seal.

25. The drainpipe test plug of claim 19, wherein the plurality of holes formed into the surface of the planar front surface of the plug seal each exhibit a cross-sectional shape comprising a circle, or square, or triangle, or oval, or rectangle, or combination thereof.

26. The drainpipe test plug of claim 19, wherein the plurality of holes formed into the surface of the planar front surface at least in the leading quadrant of the test plug are sized to ensure the holes are substantially open whenever the drainpipe test plug is in the plugging position.

27. The drainpipe test plug of claim 19, wherein the plurality of holes forted into the surface of the planar front surface of the plug seal are equidistantly spaced apart.

28. A drainpipe test plug for temporarily plugging a drainpipe via an opening formed in the drainpipe, comprising:
   a lever arm comprising a front portion and a rear portion;
   a positioning arm assembly that is rotatably coupled to the rear portion of the lever arm and is adapted to releasably engage with the rear portion of the lever arm and a bottom rim of the opening in order to lock the drainpipe test plug into a plugging position;
   a plug seal assembly that is securely coupled to the front portion of the lever arm and which mechanically seals the drainpipe whenever the drainpipe test plug is locked into the plugging position within the drainpipe, said plug seal assembly comprising a plug seal having a planar front surface which faces upward in the drainpipe whenever the drainpipe test plug is in the plugging position, a planar rear surface that is substantially parallel to the planar front surface and a peripheral annular rim, and wherein the plug seal comprises a leading quadrant, a right side quadrant, a left side quadrant and a trailing quadrant, said leading quadrant of the test plug contacting the interior surface of the drainpipe on a same side as the opening formed in the drainpipe whenever the drainpipe test plug is in the plugging position, and wherein the plug seal comprises a continuous channel formed into the surface of the planar front surface at least in the leading quadrant of the test plug, and wherein the channel imparts a degree of flexibility to a peripheral area of the plug seal to facilitate the insertion and removal of the drainpipe test plug from the drainpipe while providing additional sealing force against the interior of the drainpipe whenever the drainpipe test plug is in the plugging position to prevent test fluid in the drainpipe above the drainpipe test, plug from leaking past the plug seal and without jeopardizing the durability of the peripheral area of the plug seal.

29. A drainpipe test plug for temporarily plugging a drainpipe via an opening formed in the drainpipe, comprising:
   a lever arm comprising a front portion and a rear portion;
   a positioning arm assembly that is rotatably coupled to the rear portion of the lever arm and is adapted to releasably engage with the rear portion of the lever arm and a bottom rim of the opening in order to lock the drainpipe test plug into a plugging position;
   a plug seal assembly that is securely coupled to the front portion of the lever arm and which mechanically seals the drainpipe whenever the drainpipe test plug is in the plugging position within the drainpipe, said plug seal assembly comprising a plug seal having a planar front surface which faces upward in the drainpipe whenever the drainpipe test plug is in the plugging position, a planar rear surface that is substantially parallel to the planar front surface and a peripheral annular rim, and wherein the plug seal comprises a continuous channel formed into the surface of the peripheral annular rim that extends into a peripheral area of the plug seal and that has only one opening to the exterior of the plug seal, and which imparts a degree of flexibility to a peripheral area of the plug seal to facilitate the insertion and removal of the drainpipe test plug from the drainpipe without jeopardizing the durability of the peripheral area of the plug seal or degrading the stiffness of the plug seal to the point that test fluid leaks past the plug seal whenever the drainpipe test plug is locked into the plugging position.

30. A drainpipe test plug for temporarily plugging a drainpipe via an opening formed in the drainpipe, comprising:
   a lever arm comprising a front portion and a rear portion;
   a positioning arm assembly that is rotatably coupled to the rear portion of the lever arm and is adapted to releasably engage with the rear portion of the lever arm and a bottom rim of the opening in order to lock the drainpipe test plug into a plugging position;
   a plug seal assembly that is securely coupled to the front portion of the lever arm and which mechanically seals the drainpipe whenever the drainpipe test plug is locked into the plugging position within the drainpipe, said plug seal assembly comprising a plug seal having a planar front surface which faces upward in the drainpipe whenever the drainpipe test plug is in the plugging position, a planar rear surface that is substantially parallel to the planar front surface and a peripheral annular rim, and wherein the plug seal comprises a leading quadrant, a right side quadrant, a left side quadrant and a trailing quadrant, said leading quadrant of the test plug contacting the interior surface of the drainpipe on a same side as the opening formed in the drainpipe whenever the drainpipe test plug is in the plugging position, and wherein the plug seal comprises a plurality of holes formed into the surface of the planar front surface at least in the leading quadrant of the test plug, wherein the plurality of holes formed into the surface of the planar front surface of the plug seal are formed in a first curved row that follows the edge of the front surface at a prescribed distance in from the edge and one or more additional curved rocs of holes wherein each additional curved row of holes follows the edge of the front surface at a prescribed distance in from the more outwardly adjacent curved row of holes, and wherein each of the holes extends into the body of the plug seal in a direction perpendicular to the front surface of the plug seal, and wherein the holes impart a degree of flexibility to a peripheral area of the plug seal to facilitate the insertion and removal of the drainpipe test plug from the drainpipe while providing additional sealing force against the interior of the drainpipe whenever the drainpipe test plug is in the plugging position to prevent test fluid in the drainpipe above the drainpipe test plug from leaking past the plug seal and without jeopardizing the durability of the peripheral area of the plug seal.

* * * * *

UNITED STATES PATENT AND TRADEMARK OFFICE
CERTIFICATE OF CORRECTION

| | |
|---|---|
| PATENT NO. | : 11,493,398 B2 |
| APPLICATION NO. | : 16/845480 |
| DATED | : November 8, 2022 |
| INVENTOR(S) | : George Tash and Trinidad Martinez |

Page 1 of 1

It is certified that error appears in the above-identified patent and that said Letters Patent is hereby corrected as shown below:

In the Claims

Column 20, Line 35, "secure, coupling" should be changed to --secure coupling--.

Column 20, Line 36, "front, portion" should be changed to --front portion--.

Column 20, Line 59, "plug, from" should be changed to --plug from--.

Column 21, Line 10, "forted" should be changed to --formed--.

Signed and Sealed this
Twenty-seventh Day of December, 2022

Katherine Kelly Vidal
*Director of the United States Patent and Trademark Office*